United States Patent
Qi et al.

(10) Patent No.: US 9,826,050 B2
(45) Date of Patent: Nov. 21, 2017

(54) PHOTO CHECK-IN METHOD, APPARATUS, AND SYSTEM

(71) Applicant: Tencent Technology (Shenzhen) Company Limited, Shenzhen (CN)

(72) Inventors: Ying Qi, Shenzhen (CN); Bin Liu, Shenzhen (CN); Wei Luo, Shenzhen (CN); Beiqi Wu, Shenzhen (CN); Pinlin Chen, Shenzhen (CN); Runjia Huang, Shenzhen (CN); Chao Huang, Shenzhen (CN); Wanxiang Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/191,328

(22) Filed: Jun. 23, 2016

(65) Prior Publication Data
US 2016/0308985 A1    Oct. 20, 2016

Related U.S. Application Data

(63) Continuation of application No. PCT/CN2015/070199, filed on Jan. 6, 2015.

(30) Foreign Application Priority Data

Apr. 30, 2014    (CN) .......................... 2014 1 0182855

(51) Int. Cl.
*H04L 29/08*    (2006.01)
*H04L 12/58*    (2006.01)

(52) U.S. Cl.
CPC .............. *H04L 67/18* (2013.01); *H04L 51/32* (2013.01); *H04L 67/02* (2013.01)

(58) Field of Classification Search
None
See application file for complete search history.

(56) References Cited

U.S. PATENT DOCUMENTS

2011/0307399 A1* 12/2011 Holmes .................. G06Q 30/02
                                                    705/319
2012/0076367 A1*  3/2012 Tseng ................. G06K 9/00288
                                                    382/118

(Continued)

FOREIGN PATENT DOCUMENTS

CN         102880953 A    1/2013
CN         103167404 A    6/2013

(Continued)

OTHER PUBLICATIONS

Tencent Technology, IPRP, PCT/CN2015/070199, dated Nov. 1, 2016, 5 pgs.

(Continued)

*Primary Examiner* — Thomas Dailey
(74) *Attorney, Agent, or Firm* — Morgan, Lewis & Bockius LLP

(57) ABSTRACT

Method and device of sharing photos and associated information among users of a social network platform are disclosed. The method includes: a mobile device sending, to a server, a first location of a first photo and a current location of the mobile device; receiving a first plurality of POIs, at least one of which is located near the first location of the first photo and another one of which is located near the current location of the mobile device; determining a first POI among the first plurality of POIs as a first check-in location of the first photo; and sending the first photo and the first POI to the server.

14 Claims, 22 Drawing Sheets

(56) References Cited

U.S. PATENT DOCUMENTS

| | | | |
|---|---|---|---|
| 2012/0233158 A1* | 9/2012 | Braginsky | H04L 67/18 707/724 |
| 2013/0138741 A1 | 5/2013 | Redstone et al. | |
| 2013/0204705 A1* | 8/2013 | Song | G06Q 30/0267 705/14.58 |
| 2013/0238724 A1* | 9/2013 | Cunningham | H04L 51/24 709/206 |
| 2013/0325855 A1* | 12/2013 | Kapicioglu | G06F 17/30241 707/724 |
| 2014/0250175 A1* | 9/2014 | Baldwin | G06K 9/00677 709/204 |
| 2015/0127744 A1* | 5/2015 | Moreels | G06Q 10/0833 709/204 |
| 2015/0172328 A1* | 6/2015 | Haugen | H04L 67/22 715/753 |
| 2015/0178322 A1* | 6/2015 | Smietanka | G06F 17/30268 707/772 |

FOREIGN PATENT DOCUMENTS

| | | | |
|---|---|---|---|
| CN | 104253740 A | 12/2014 | |
| EP | 2211276 A1 | 7/2010 | |

OTHER PUBLICATIONS

Tencent Technology, ISRWO, PCT/CN2015/070199, dated Apr. 20, 2015, 7 pgs.

\* cited by examiner

Server System 1208

PHOTO CHECK-IN METHOD, APPARATUS, AND SYSTEM

RELATED APPLICATION

This application is a continuation application of PCT Patent Application No. PCT/CN2015/070199, entitled "PHOTO CHECK-IN METHOD, APPARATUS, AND SYSTEM" filed on Jan. 6, 2015, which claims priority to Chinese Patent Application No. 201410182855.0, entitled "PHOTO CHECK-IN METHOD, APPARATUS, AND SYSTEM" filed on Apr. 30, 2014, both of which are incorporated by reference in their entirety.

TECHNICAL FIELD

The disclosed implementations relate to the field of information retrieval, and in particular, to a photo check-in method, apparatus, and system.

BACKGROUND

It is popular for social network application users to share their photos at a particular place to show that they have been the place. For example, when a user A is having special snacks in a restaurant, the user A may post a photo of the special snacks in a social networking application as a way to "check in" the restaurant.

In a process of check-in by posting a photo, the user may enter either the location of the photo or the current location of the user, search points of interest (the "POIs") that are possibly be the places to check in and select POIs as the check-in locations. In addition, a user may want to post multiple photos from multiple locations, and therefore check in multiple locations at once. The manual operation of searching, acquiring, determining and entering locations of photos can be quite complicated. It is desirable to have a method and device that intelligently determines the locations of photos and displays the locations and photos intuitively.

SUMMARY

In accordance with some implementations of the disclosed technology, a method of sharing photos and associated information among users of a social network platform is performed at a mobile device (e.g., mobile device 1210, FIGS. 12-14) with one or more processors, and memory. The method includes: sending, to a server, a first location of a first photo and a current location of the mobile device; receiving, from the server, a first plurality of POIs, at least one of which is located near the first location of the first photo and another one of which is located near the current location of the mobile device; determining a first POI among the first plurality of POIs as a first check-in location of the first photo; and sending the first photo and the first POI to the server, wherein the server causes the first photo and the first check-in location to be shared among users of the social network.

In some embodiments, a non-transitory computer readable storage medium storing one or more programs, the one or more programs comprising instructions, which, when executed by a mobile device (e.g., mobile device 1210, FIGS. 12-14), cause the mobile device to perform the operations of any of the methods described herein. In some embodiments, a mobile device (e.g., mobile device 1210, FIGS. 12-14) includes means for performing, or controlling performance of, the operations of any of the methods described herein.

In accordance with some implementations of the disclosed technology, a method of sharing photos and associated information among users of a social network platform is performed at a server (e.g., server 1208, FIGS. 12-13) with one or more processors, and memory. The method includes: from a mobile device, receiving a first location of a first photo and a current location of the mobile device; in response to receiving the first location of the first photo and the current location of the mobile device, acquiring a first plurality of POIs, at least one of which is located near the first location of the first photo and another one of which is located near the current location of the mobile device; sending the first plurality of POIs to the mobile device; after sending the first plurality of POIs to the mobile device, receiving the first photo and a first POI among the first plurality of POIs as a first check-in location of the first photo; and in response to receiving the first check-in location, causing the first photo and the first check-in location to be shared among users of the social network.

BRIEF DESCRIPTION OF THE DRAWINGS

The aforementioned features and advantages of the disclosed implementations as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the disclosed implementations more clearly, the following describes the implementation manners of the disclosed implementations in further detail with reference to the accompanying drawings.

Figure 1:
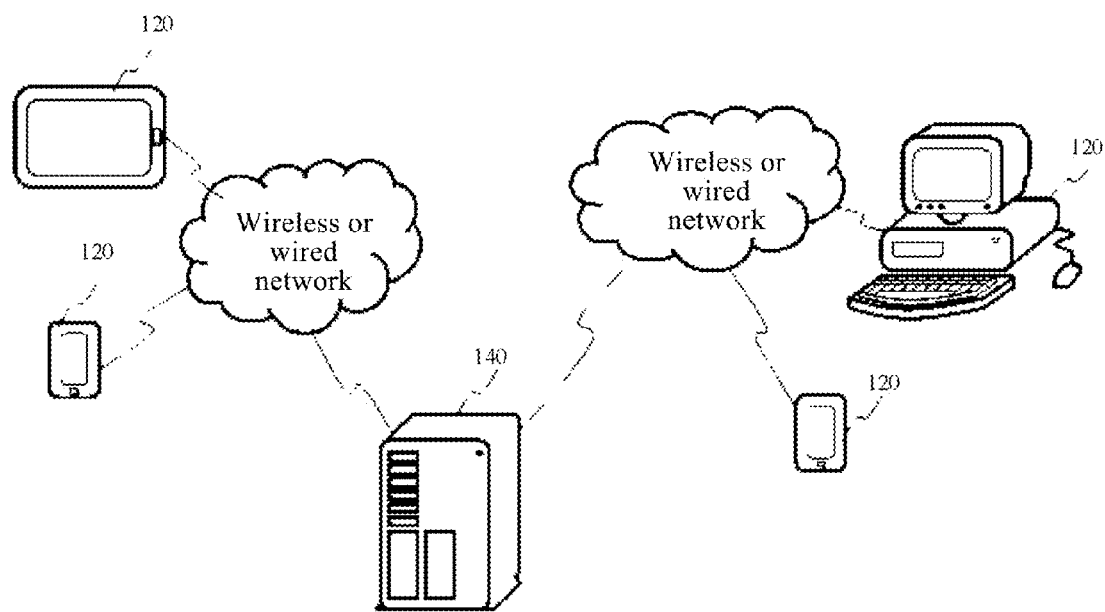
FIG. 1 is a schematic structural diagram of an implementation environment of a photo check-in method in accordance with some embodiments.

FIG. 1 shows a schematic structural diagram of an implementation environment involved in a photo check-in method in accordance with some embodiments. The implementation environment includes a mobile device 120 and a server 140.

The mobile device 120 may be a mobile phone, a tablet computer, an e-book reader, a Moving Photo Experts Group Audio Layer III (MP3) player, a Moving Photo Experts Group Audio Layer IV (MP4) player, or the like. A client is operated in the mobile device 120, and the client may be a social networking application client which provides the function of checking in by posting a photo.

The mobile device 120 may be connected to the server 140 through a wired network or a wireless network.

The server 140 may be a server, a server cluster formed by multiple servers, or a cloud computing center. The server 140 provides a background service for the social networking application client.

Figure 2:
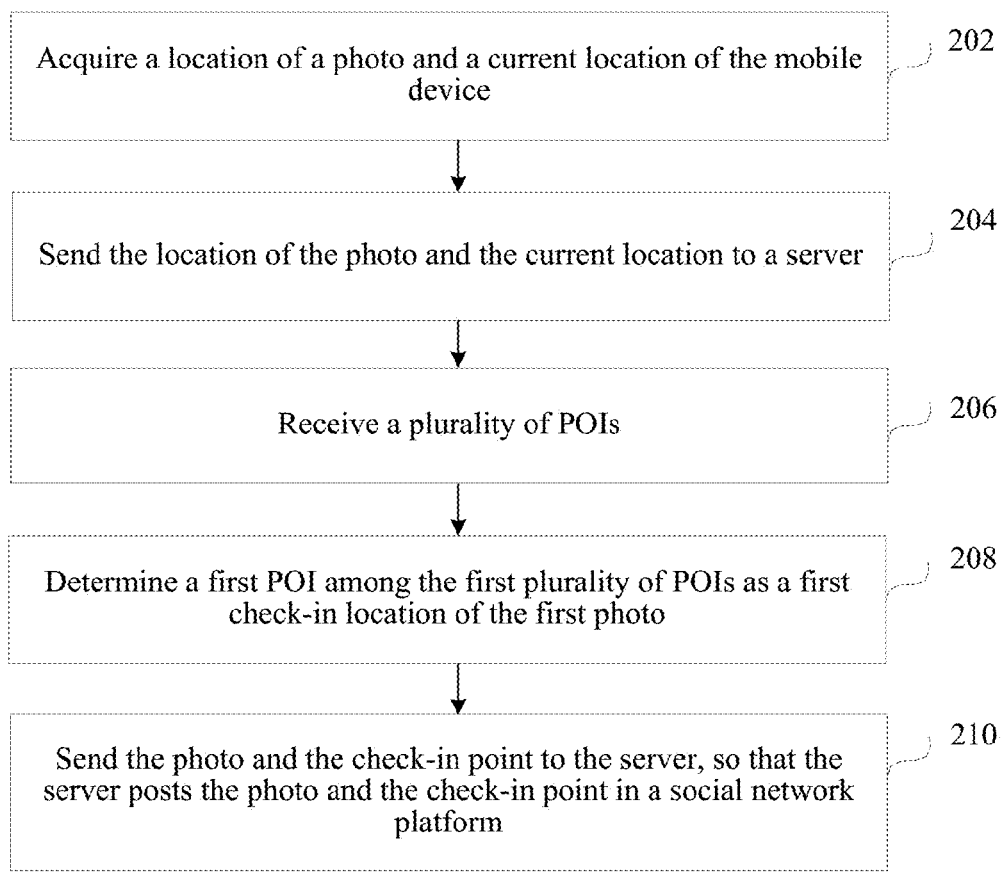
FIG. 2 is a flowchart of a photo check-in method in accordance with some embodiments.

FIG. 2 shows a flowchart of a photo check-in method in accordance with some embodiments. The photo check-in method includes the following steps.

In accordance with some embodiments, in a step 202, a mobile device acquires a location of a photo and a current location of the mobile device.

In accordance with some embodiments, in a step 204, the mobile device sends the location of the photo and the current location to a server.

In accordance with some embodiments, in a step 206, the mobile device receives, from the server, a plurality of POIs. In some embodiments, at least one of the POIs is located near the first location of the first photo and another one is located near the current location of the mobile device.

A POI is a kind of navigation map information that corresponds to a specific point location that a user may find useful, interesting or meaningful. In some embodiments, a POI may include information in five aspects, including a name, a category, latitude and longitude, an address and area information.

In accordance with some embodiments, in a step 208, the mobile device determines a POI among the plurality of POIs as a check-in location of the photo.

In accordance with some embodiments, in a step 210, the mobile device sends the photo and the POI to the server. In some embodiments, the server causes the photo and the check-in location to be shared among users of the social network.

Figure 3:
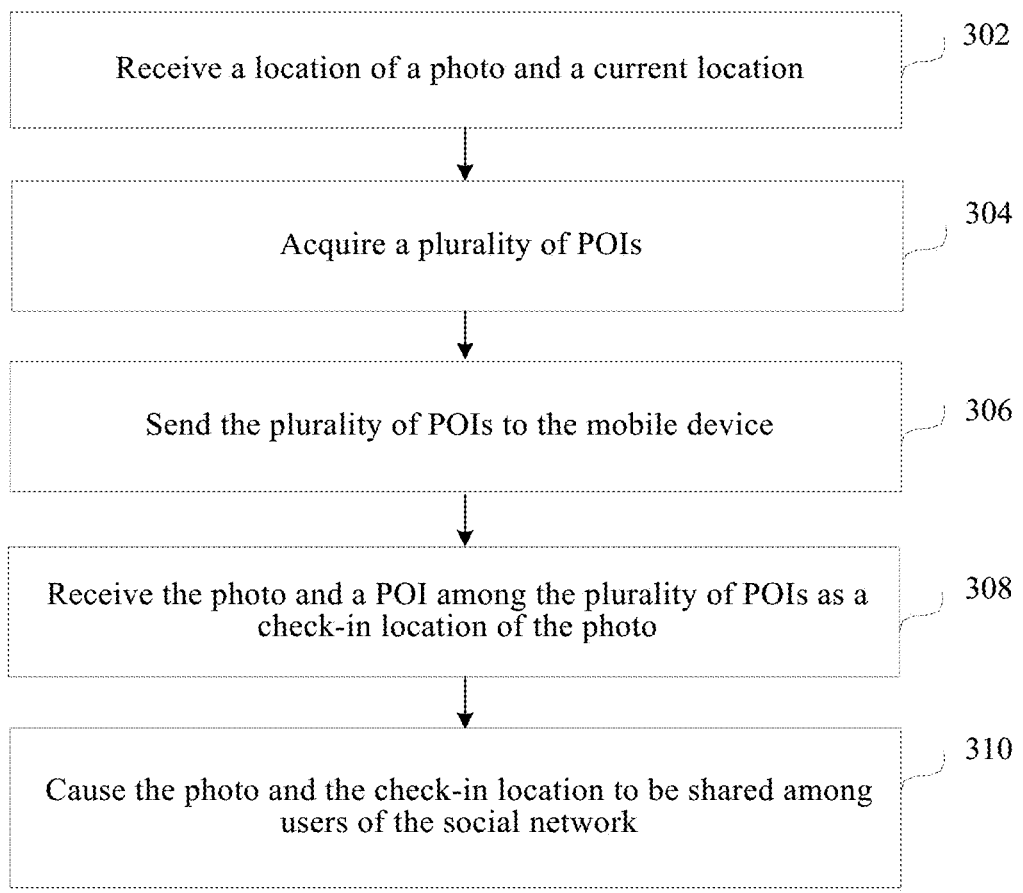
FIG. 3 is a flowchart of a photo check-in method in accordance with some embodiments.

FIG. 3 shows a flowchart of a photo check-in method in accordance with some embodiments. The photo check-in method includes the following steps.

In accordance with some embodiments, in a step 302, a server, from a mobile device, receives a location of a photo and a current location of the mobile device.

In accordance with some embodiments, in a step 304, the server acquires a plurality of POIs, at least one of which is located near the location of the photo and another one of which is located near the current location of the mobile device.

In accordance with some embodiments, in a step 306, the server sends the plurality of POIs to the mobile device.

In accordance with some embodiments, in a step 308, the server receives the photo and a POI to the server among the plurality of POIs as a check-in location of the photo.

In accordance with some embodiments, in a step 310, the server causes the photo and the check-in location to be shared among users of the social network.

Figure 4A:
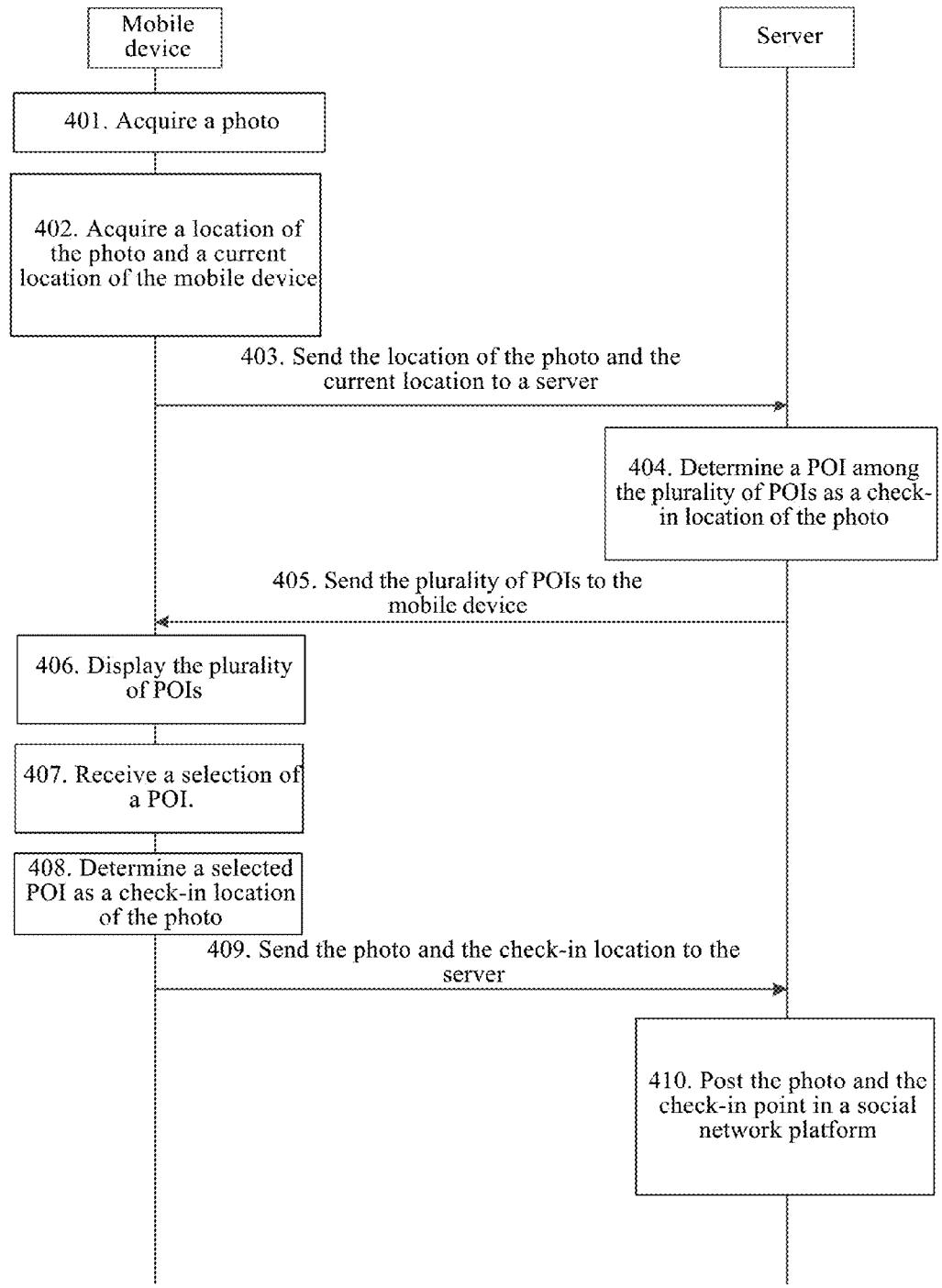
FIG. 4A is a flowchart of a photo check-in method in accordance with some embodiments.

FIG. 4A shows a flowchart of method of sharing photos and associated information among users of a social network platform in accordance with some embodiments. The method can be performed by a mobile device (e.g., mobile device 1210, FIGS. 12-14), a server (e.g., server 1208, FIGS. 12-13), or both. In some embodiments, a social network platform is a platform which can simultaneously send to multiple friends having viewing permissions in a relationship link, information posted by a user, such as a social networking space, a microblog platform, and a platform of a circle of friends. The method includes the following steps.

In accordance with some embodiments, in a step 401, the mobile device acquires a first photo.

In some embodiments, when a user needs to check in by posting a photo, a mobile device may acquire one or more photos obtained by the user by taking photos with the mobile device. Alternatively, the user may also select a photo from photos pre-stored in the mobile device or in a remote server. In some embodiments, the mobile device acquires multiple photos that includes at least the first photo and a second photo. For example, the user drags and selects multiple photos or selects a folder containing photos or an album and the mobile device acquires multiple photos at once.

Figure 4B:
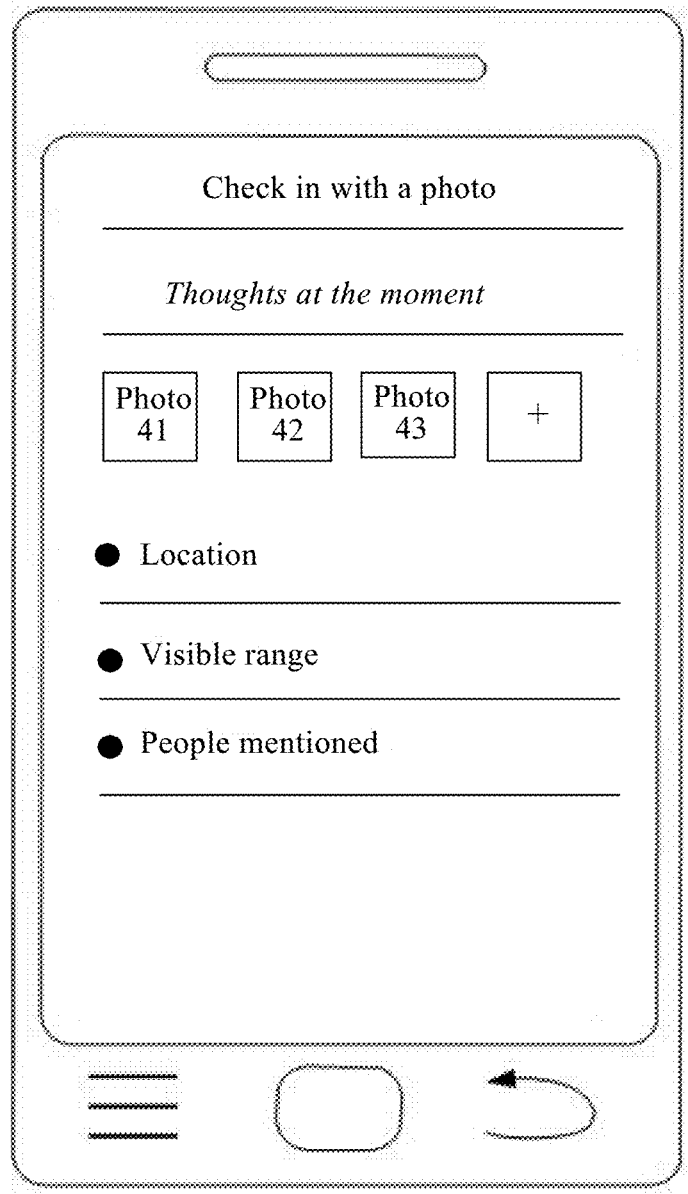
FIGS. 4B-4I are schematic interface diagrams of the photo check-in method in accordance with some embodiments.

As shown in FIG. 4B, the mobile device acquires three photos selected by the user from the pre-stored photos, which are a photo 41, a photo 42, and a photo 43.

In accordance with some embodiments, in a step 402, the mobile device identifies a location of a photo and the current location of the mobile device.

After the mobile device acquires a photo, the mobile device needs to acquire the location of the acquired photo and the current location of the mobile device. In some embodiments, when a photo is taken using the mobile device, the location of the mobile device at the time of taking the photo is stored in association with the photo. The mobile device acquires the location stored in association with the photo as the location of the photo. In some embodiments, the photo is taken immediately before uploading to the server, the current location of the mobile device is recognized as the location of the photo.

In some embodiments, a location can be indicated by using the latitude and longitude. If the photo is selected from existing photos, the mobile device reads the latitude and longitude data that is associated with the photo, and uses the latitude and longitude as the location of the photo. If the photo is shot in real time, the mobile device may also position a geographical location of the mobile device in real time, and use the geographical location obtained by positioning as the location of the photo. For example, the mobile device uses a Global Positioning System (GPS) positioning technology to position a geographical location of the mobile device.

In some embodiments, when there are multiple photos to be checked in, the mobile device may determine whether all locations of the photos should be sent to the server. In accordance with some embodiments, the mobile device determines whether to send a location of a photo to the server in accordance with predetermined criteria. In some embodiments, the predetermined criteria include user's choice, availability of a location, the distance between a location of a photo and a current location, orders of photos and locations, and the time of a photo being taken. For example, the criteria may include that, if the distance between a location of a photo and the current location of the mobile device exceeds 10 miles, the location of the photo is automatically ignored and not sent to the server for search. For another example, the criteria include that only the location of the last photo of the multiple photos is sent to the server for searching. For yet another example, the mobile device may determine that based on previous user settings, locations of photos that are taken 24 hours ago are not be used to check in.

In accordance with some embodiments, in a step 403, the mobile device sends a location of a photo and the current location to the server. Consequently, the server receives the location of the photo and the current location of the mobile device from the mobile device.

In some embodiments, the mobile device sends a POI searching request to the server. The searching request includes the location of a photo and the current location. In some embodiments, the POI searching request includes all the location of the photos and the current location. In some embodiments, the mobile device sends one request for each location.

In some embodiments, the mobile device sends multiple locations of photos to the server. In some embodiments, after sending, to the server, the first photo to be displayed in the social network and the first location that is associated with the first photo, the mobile device sends a second photo and a second location that is associated with the second photo to the server;

In accordance with some embodiments, in a step 404, in response to receiving the location of the photo and the current location of the mobile device, the server acquires a plurality of POIs. In some embodiments, among the plurality of POIs, at least one of them is located near the first location of the first photo and another one of them is located near the current location of the mobile device.

In some embodiments, the server acquires a plurality of POIs for each location received from the mobile device. In some embodiments, the server separately searches for the plurality of POIs in predetermined ranges within locations of photos and the current location. For example, the predetermined range may be a circular range with a radius of 0.3 kilometers. After receiving three locations of the photos, the server separately searches for a first plurality of POIs in a circular range with the first location of the first photo as a central point and 0.3 kilometers as a radius, searches for a second plurality of POIs in a circular range with the second location of the second photo as a central point and 0.3 kilometers as a radius, searches for a third plurality of POIs in a circular range with the third location of the first photo as a central point and 0.3 kilometers as a radius. In some embodiments, for each geographical location, the server may limit the number of candidate POIs in accordance with distances.

In accordance with some embodiments, in a step 405, the server sends the plurality of POIs to the mobile device. Therefore, the mobile device receives, from the server, the plurality of POIs, at least one of which is located near the first location of the first photo and another one of which is located near the current location of the mobile device.

In accordance with some embodiments, the server may send all candidate POIs to the mobile device in one piece of information. The server may also send all candidate POIs to the mobile device in multiple pieces of information and each piece carries a candidate POI corresponding to a location or a current location. In some embodiments, when the mobile device sends multiple locations and photos to the server for one post, the mobile device indicates to the server that the multiple locations and photos belong to one post.

In accordance with some embodiments, the mobile device determines a check-in location for each plurality of POIs. In some embodiments, the determining the POI among the plurality of POIs as the check-in location further comprises: displaying the first plurality of POIs that are received from the server; receiving a user's selection of at least one of the plurality of the points of interest; and in accordance with the user's selection, determining the respective selected one of the first plurality of the points of interest as the first check-in location. The process of determining a POI is illustrated in steps 406-408 and in FIGS. 4C-4E.

In accordance with some embodiments, in a step 406, the mobile device displays the plurality of POIs.

In some embodiments, the mobile device may display the received plurality of POIs in the predetermined order. The sorting process may be executed by the mobile device or the server.

In accordance with some embodiments, if the number of location of the photos is more than one, the mobile device displays the candidate POIs according to the display priority based on the order of the photos.

If the mobile device further receives area information corresponding to each candidate POI, the mobile device displays each piece of area information with a corresponding POI.

Figure 4C:
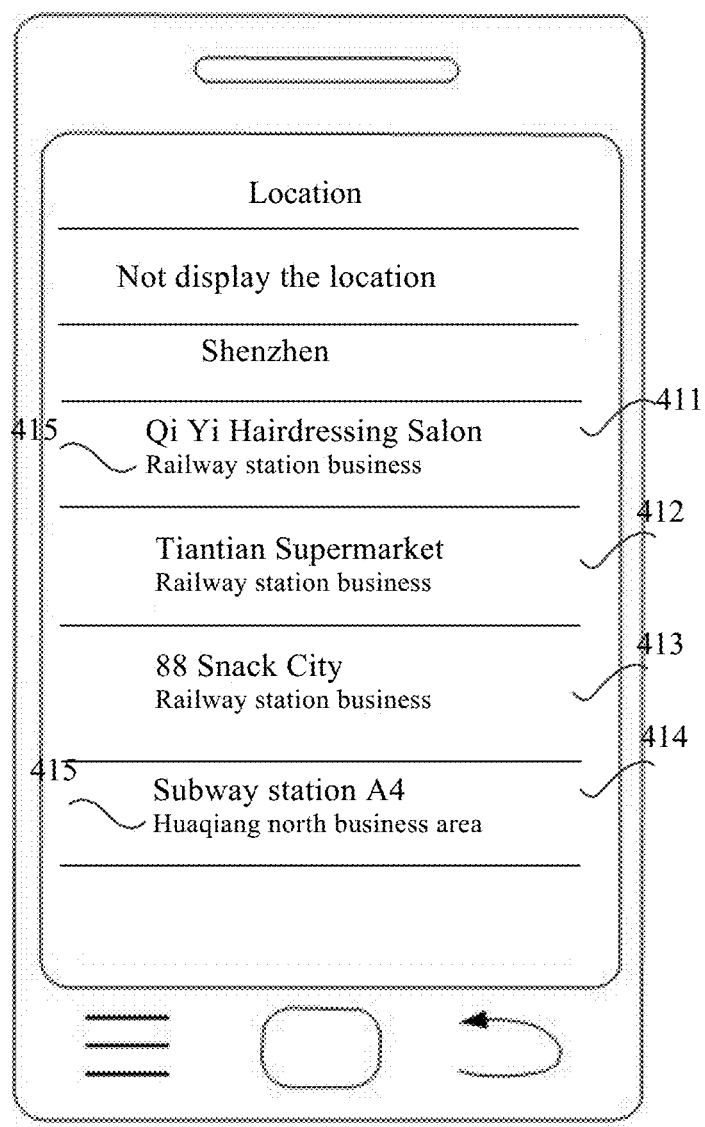

For example, as shown in FIG. 4C, the mobile device receives four candidate POIs. A candidate POI 411 corresponds to a location of the first photo, a candidate POI 412 corresponds to a second location of the second photo, a candidate POI 413 corresponds to a third location of the third photo, and a candidate POI 414 is corresponds a current location of the mobile device. The mobile device may display the candidate POI 411, the candidate POI 412, the candidate POI 413, and the candidate POI 414 from top to bottom, and area information 415 corresponding to each POI in the same row.

Figure 4D:
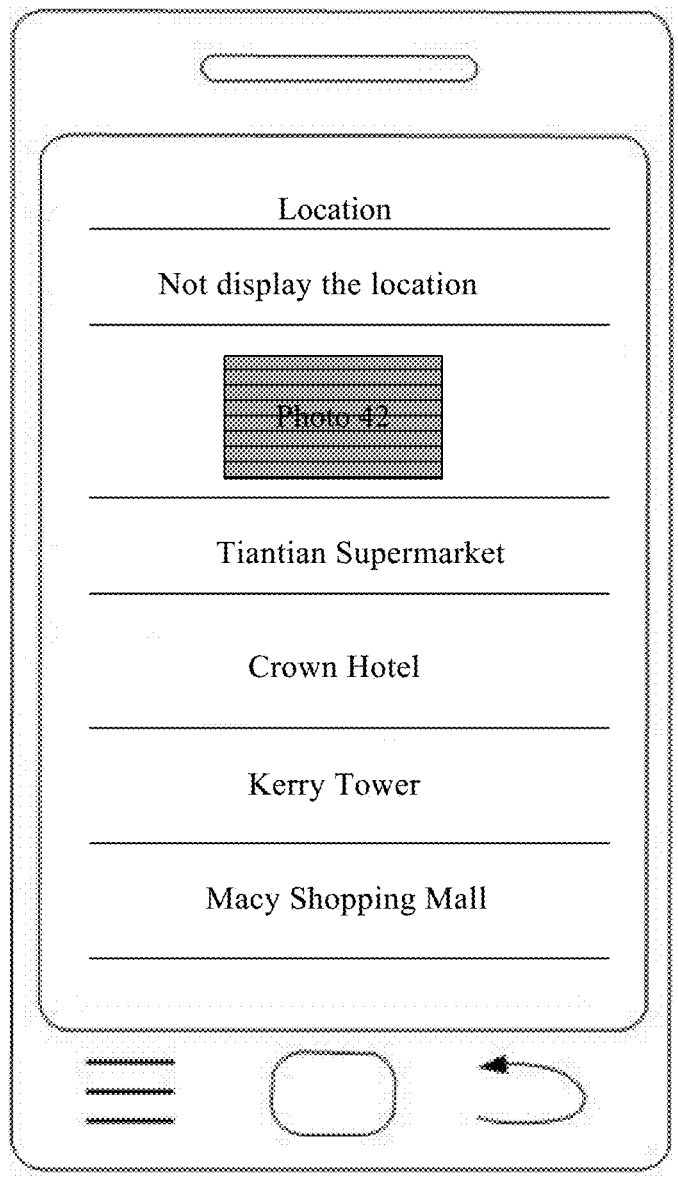
Figure 4E:
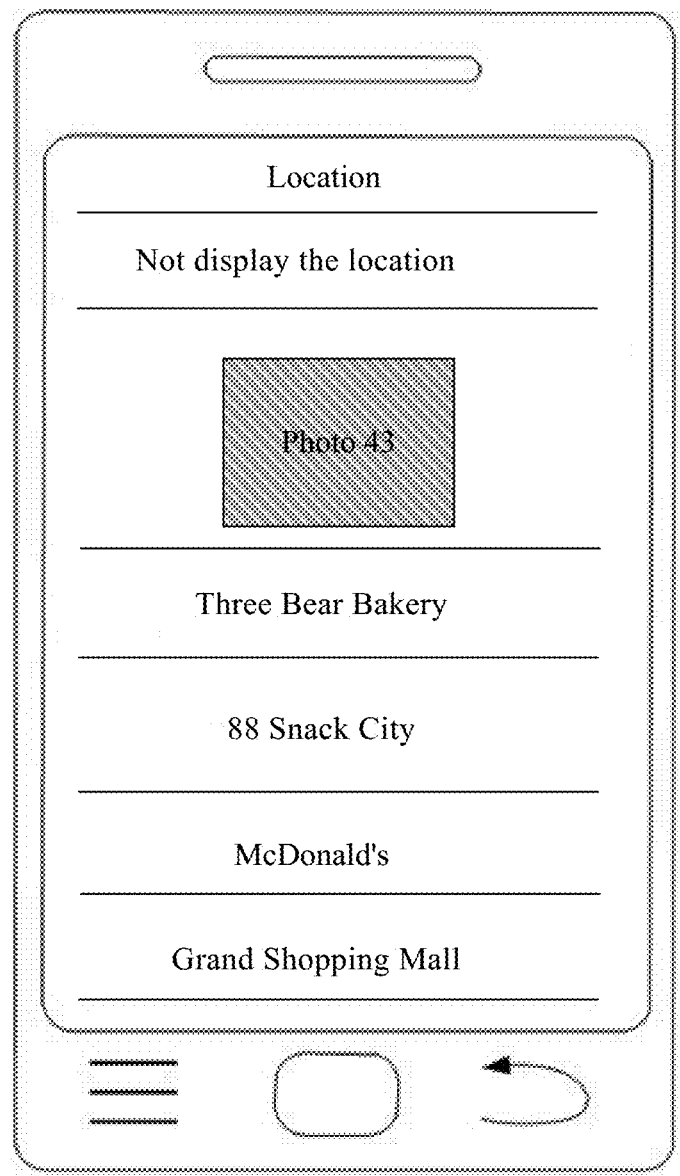

In accordance with some embodiments, the POIs in a particular location are displayed in association with the photo of that location. For example, FIG. 4D illustrates that the mobile device receives a second plurality of POIs and displays them in association with the second photo 42. After the user views and possibly selects from the second plurality of POIs, the user may slide the screen and view the third plurality of POIs in association with the third photo 43, as shown in FIG. 4E.

In accordance with some embodiments, in a step 407, the mobile device receives a selection of a POI among the plurality of POIs as a check-in location of a photo. For example, the selection signal may be a touch signal of a user touching the touch panel or a pressing signal for a user pressing a physical button.

In accordance with some embodiments, in a step 408, the mobile device determines the selected POI as the check-in location of the photo. In some embodiments, the user has a lot of flexibility in choosing which location is the check-in location for which photo and does not have to select a check-in location for every photo. For example, the user may select the current location as the check-in location of all photos to be checked in. For another example, the user may select a POI from a second plurality of POIs as the check-in locations of all photos except the first one, which has no check-in location.

In accordance with some embodiments, in a step 409, the mobile device sends the photo and the check-in location to the server. Therefore, after sending the first plurality of POIs to the mobile device, the server receives the first photo and a first POI to the server among the first plurality of POIs as a first check-in location of the first photo. In addition, when there are multiple check-in locations, for example, a second POI being determined as a check-in location for a second photo, the mobile device sends multiple check-in locations including the second POI as the check-in location for the second photo to the server.

In some embodiments, in addition to send the photo and the check-in location to the server, the mobile device also receives user input of comments related with the photo and/or the check-in locations and sends the comments to the server.

Figure 4F:
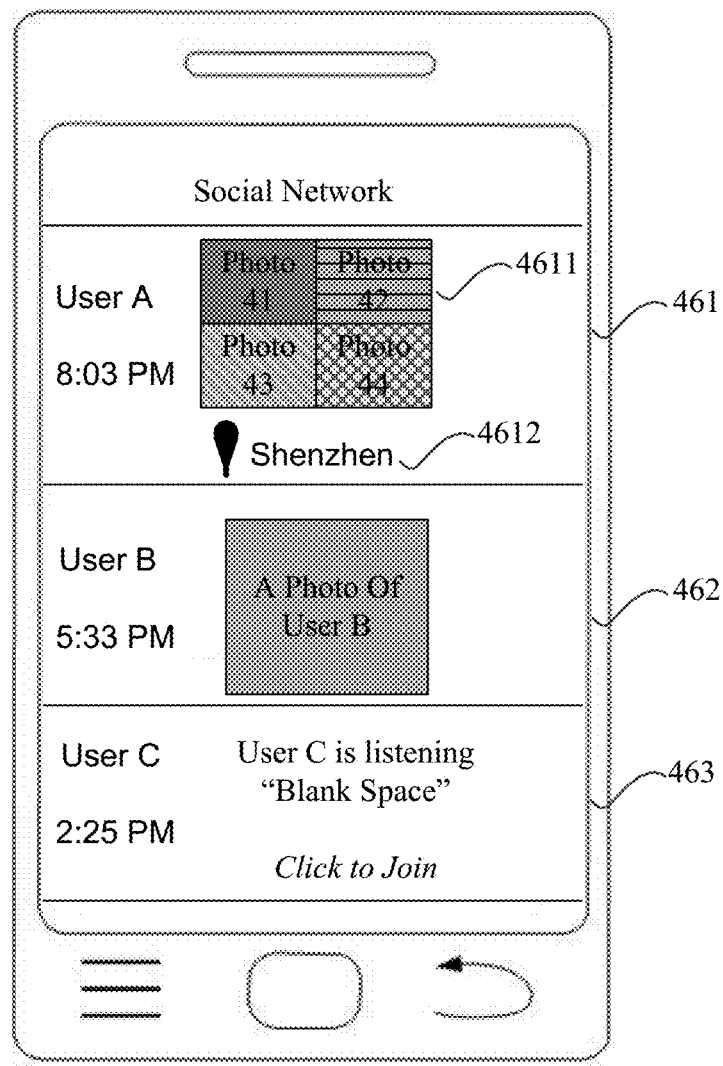
Figure 4G:
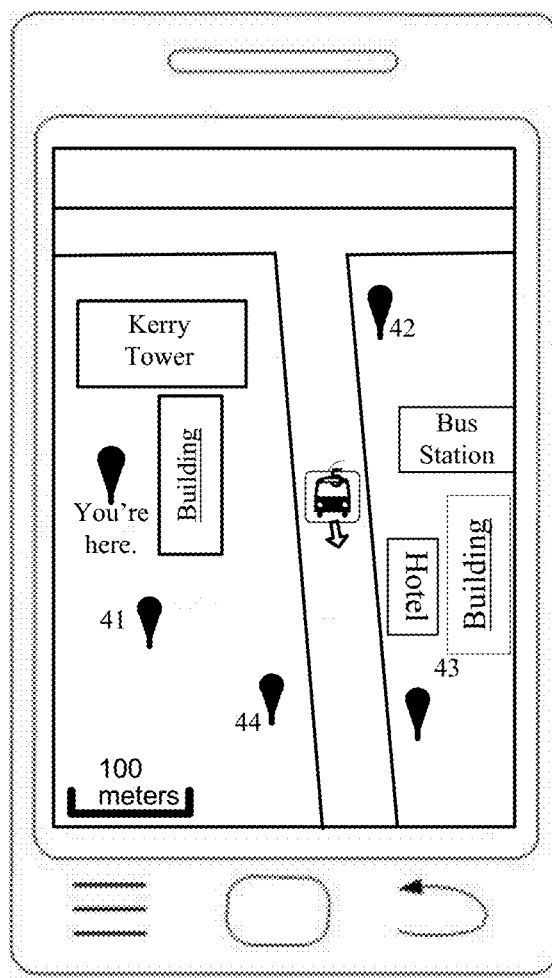
Figure 4H:
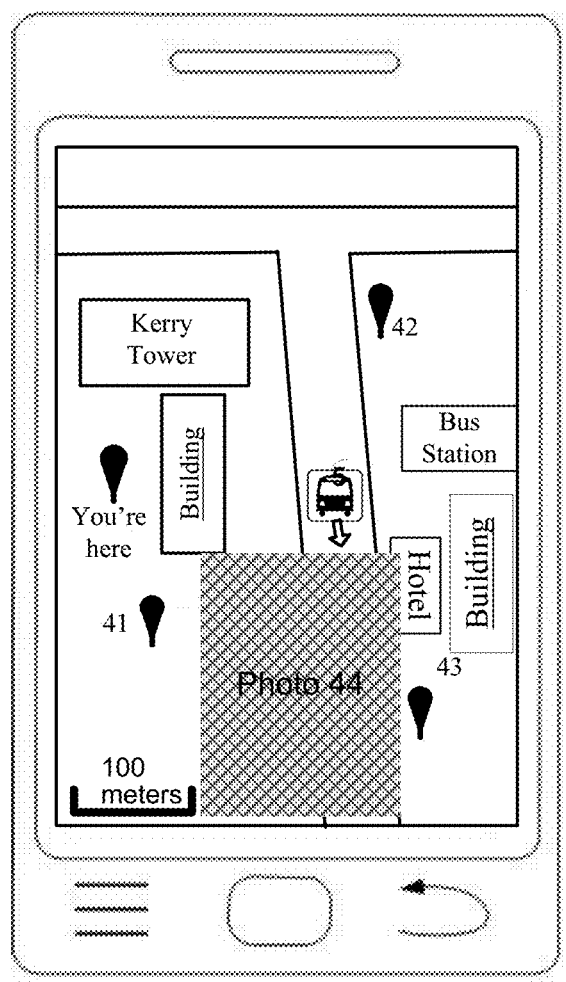
Figure 4I:
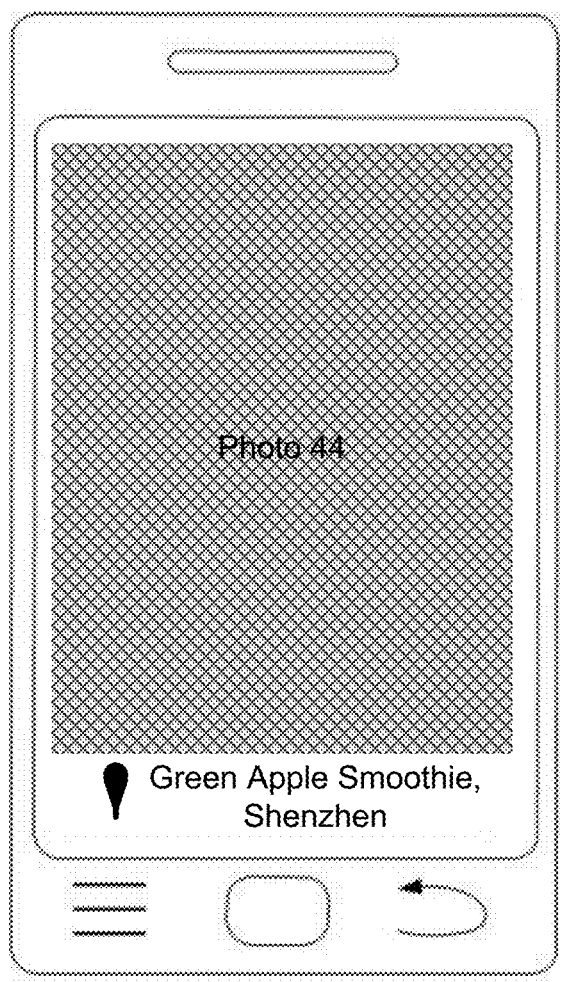

In accordance with some embodiments, in a step 410, in response to receiving the first check-in location that is one of the plurality of POIs from the mobile device, the server causes the photo and the check-in location to be shared among users of the social network. When there is a second photo and a second check-in location, the server causes the second photo and the second check-in location to be shared among users of the social network. For example, FIG. 4F shows a mobile device displaying a post that contains photos and check-in locations. In some embodiments, the photos and check-in locations displayed by a mobile device can be sent from this mobile device or other devices. FIG. 4I shows a mobile device displaying a photo and a check-in location of the photo. In some embodiments, the post also includes the comment of the users that is related with the photo and/or the check-in location.

In accordance with some embodiments, based on the predetermined template, the check-in location is displayed in association with the first photo in the generated post in the social network. For example, after sending the first POI to the server, receiving a post that includes the first check-in location, the first photo and association information between the first check-in location and the first photo; and in response to receiving the post, the mobile device displays the post in the social network. For example, the association information could be a format arrangement that places the check-in location close to the first photo. In some embodiments, the predetermined template includes how the locations and photos are presented, e.g., whether the location is presented in a map, whether the address of the location is displayed, the size of the photo, the order of photos and locations when there are multiple photos and locations, etc.

In accordance with some embodiments, the server generates a map that includes the check-in location, includes the map in the generated post, and sends the map to the mobile device along with the post. Then, in the social network, the mobile device receives and displays the map that includes the check-in location, as illustrated in FIG. 4G. Other mobile devices may receive and similarly display the post including the map as well. For example, when a user sees his mobile device displaying an interface including a post sharing a photo and a check-in location, as the one shown in FIG. 4F. FIG. 4F shows an interface of a mobile device displaying three posts, post 461, post 462 and post 463. Post 461 includes four photos, photo 41, photo 42, photo 43, and photo 44 and an encompassing location 4612, Shenzhen. The user may open the post 461 to view more details of the photo and the check-in location. After the user selects the post 461, a map including the check-in location is presented by the mobile device as shown in FIG. 4G. The map in FIG. 4G displays the check-in locations for four photos 41, 42, 43, and 44 as well as the current location of the mobile device.

In some embodiments, when the mobile device receives a user selection of the first check-in location in the map, in response to the user selection of the first check-in location in the map, the mobile device displays the photo corresponding to the check-in location. In some embodiments, when the check-in location is selected, the device displays the first photo that is overlaid over the map, as shown in FIG. 4H. In some embodiments, the device replaces the map with the photo, as shown in FIG. 4I. In some embodiments, the photo is initially overlaid over the map, but, upon a further selection by the user, enters into a full-screen mode and replaces the map.

In accordance with some embodiments, when the mobile device sends multiple photos to the server, the server determines a granularity level at which an encompassing location comprises the first location and the second location and determines the encompassing location. For example, if all the check-in locations for one post are within the same city, city level could be an appropriate granularity level and the city comprising all the check-in locations could be the encompassing location. For example, a mobile device sends four check-in locations to a server for a same post, and the four check-in locations belong to a same county, then the server determines the county level as a lowest appropriate granularity level and sets the county as the encompassing location. The server then sends the encompassing location to the mobile device, causing the mobile device to display the encompassing location in association with the multiple photos. For example, when the mobile sends a first and a second photo and a first location of the first photo and a second location of the second photo to the server, the server sends an encompassing location comprises the first check-in location and the second check-in location to the mobile device. The mobile device then displays the encompassing location in association with the first photo and the second photo through an application of the social network. For example, in FIG. 4F, Shenzhen (shown as 4612) is the encompassing location that comprises the locations of all four photos. In some embodiments, the server acquires area information where each candidate POI is located. The area information may refer to areas defined in advance according to, for example, division principles of business areas or administrative blocks, for example, area information where "XX hotel" is located is "a railway station business area". Then, the server sends the plurality of POIs and area information corresponding to each candidate POI to the mobile device.

In accordance with some embodiments, the server generates a picture that includes at least part of information from the first photo and at least part of information from the second photo and causes the generated picture to be shared together with the encompassing location among users of the social network. In some embodiments, the generated picture is a combination of thumbnails of included photos. For example, 4611 as shown in FIG. 4F is a picture that is generated by the server and combines the four photos received by the server. The mobile device, from the server, receives the picture that includes at least part of information from the first photo and at least part of information from the second photo, and displays the created picture in association with the encompassing location. In some embodiments, when a user selects the displayed encompassing location, the mobile device displays the map. If the user selects the created picture, multiple pictures are displayed as if in an album.

Figure 5:
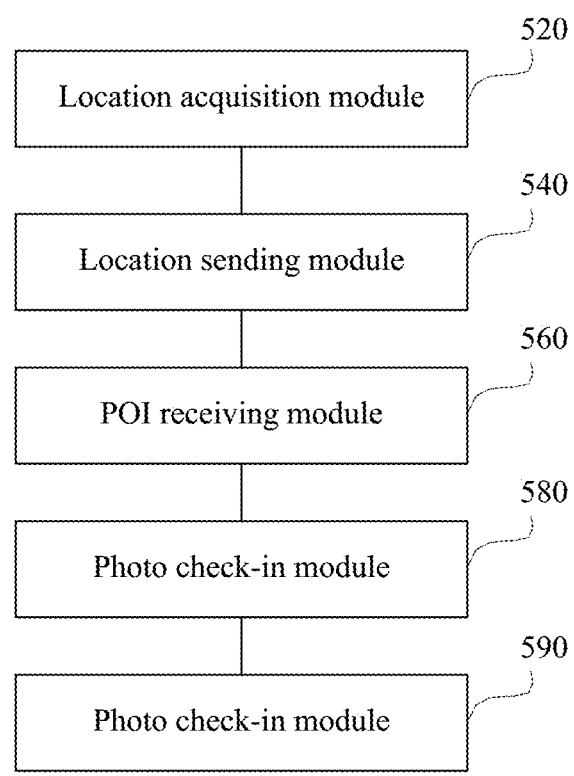
FIG. 5 is a structural block diagram of a photo check-in apparatus in accordance with some embodiments.

FIG. 5 is a structural block diagram of a photo check-in apparatus in accordance with some embodiments. The photo check-in apparatus may be implemented as all or a part of a mobile device by using software, hardware, or a combination of software and hardware, and the photo check-in apparatus includes: a location acquisition module 520, a location sending module 540, a POI receiving module 560, a photo check-in module 580, and a photo check-in module 590.

In accordance with some embodiments, the location acquisition module 520 is configured to acquire a location of a photo and a current location of the mobile device.

In accordance with some embodiments, the location sending module 540 is configured to send the location of the photo and the current location to a server.

In accordance with some embodiments, the POI receiving module 560 is configured to receive the plurality of POIs sent by the server.

In accordance with some embodiments, the photo check-in module 580 is configured to determine one of the plurality of POIs as a check-in location of the photo.

In accordance with some embodiments, the photo check-in module 590 is configured to send the photo and the check-in location to the server, so that the server posts the photo and the check-in location in a social network platform.

Figure 6:
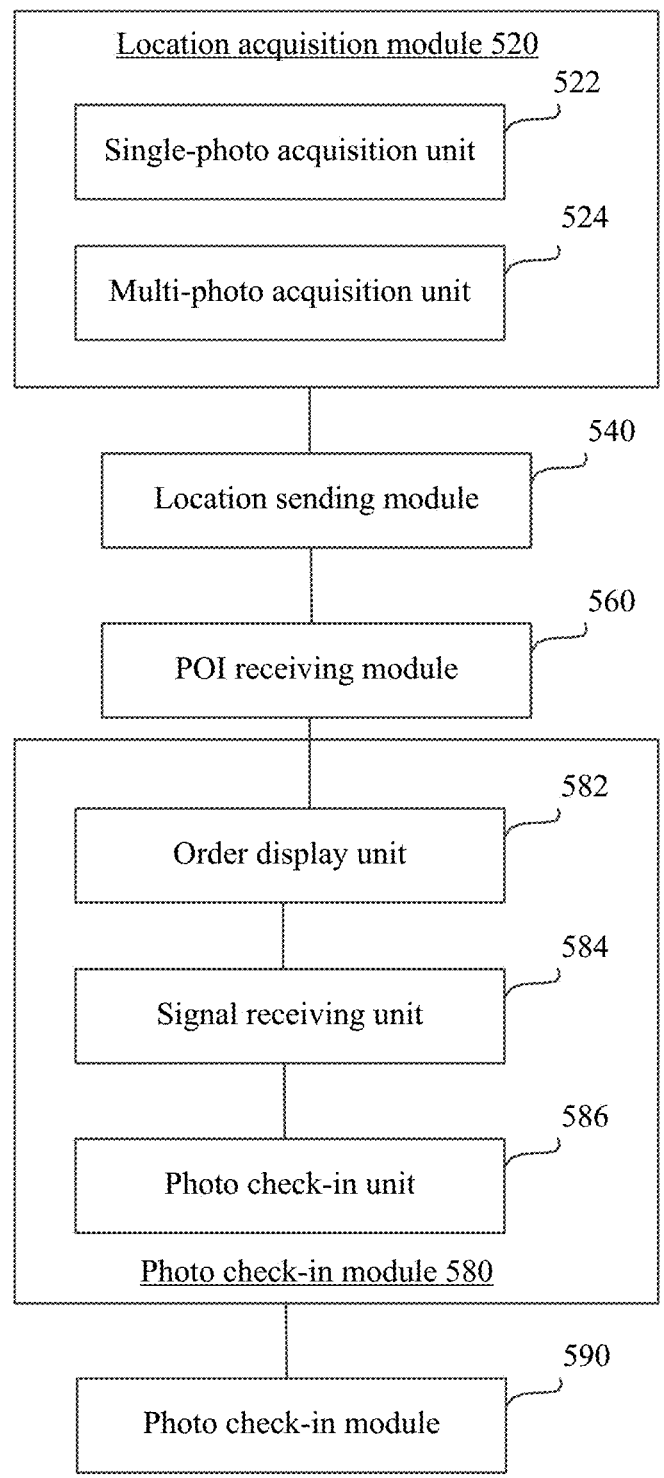
FIG. 6 is a structural block diagram of a photo check-in apparatus in accordance with some embodiments.

FIG. 6 shows a structural block diagram of a photo check-in apparatus in accordance with some embodiments. The photo check-in apparatus may be implemented as all or a part of a mobile device by using software, hardware, or a combination of software and hardware, and the photo check-in apparatus includes: a location acquisition module 520, a location sending module 540, a POI receiving module 560, a photo check-in module 580, and a photo check-in module 590.

The location acquisition module 520 is configured to acquire a location of a photo and a current location of the mobile device.

The location sending module 540 is configured to send the location of the photo and the current location to a server.

The POI receiving module 560 is configured to receive the plurality of POIs sent by the server.

The photo check-in module 580 is configured to determine one of the plurality of POIs as a check-in location of the photo.

The photo check-in module 590 is configured to send the photo and the check-in location to the server.

In accordance with some embodiments, the location acquisition module 520 includes a single-photo acquisition unit 522 and/or a multi-photo acquisition unit 524.

The single-photo acquisition unit 522 is configured to acquire a location of the photo. The multi-photo acquisition unit 524 is configured to acquire multiple locations corresponding to multiple photos.

In accordance with some embodiments, the photo check-in module 580 includes an order display unit 582, a signal receiving unit 584, and a photo check-in unit 586.

The order display unit 582 is configured to display the plurality of POIs according to a predetermined order.

The signal receiving unit 584 is configured to receive a selection of a candidate POI.

The photo check-in unit 586 is configured to determine a selected POI as a check-in location of the photo.

In accordance with some embodiments, the order display unit 582 is configured to, when multiple candidate POIs are received, display the candidate points of interest according to a display priority.

Figure 7:
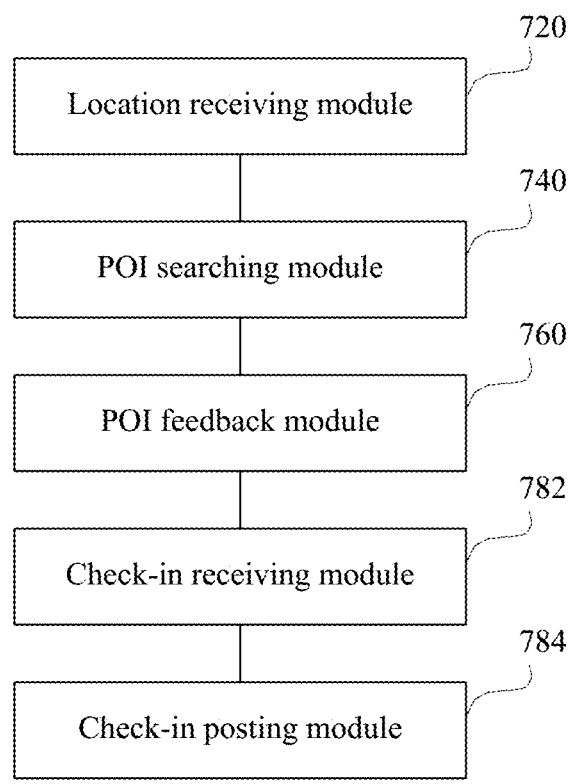
FIG. 7 is a structural block diagram of a photo check-in apparatus in accordance with some embodiments.

FIG. 7 shows a structural block diagram of a photo check-in apparatus in accordance with some embodiments. The photo check-in apparatus may be implemented as all or a part of a server by using software, hardware, or a combination of software and hardware. The photo check-in apparatus includes:

a location receiving module 720, configured to receive a location of a photo and a current location from a mobile device;

a POI searching module 740, configured to search for the plurality of POIs according to the location of the photo and the current location;

a POI feedback module 760, configured to send the plurality of POIs to the mobile device;

a check-in receiving module 782, configured to receive the photo and the check-in location that are sent by the mobile device; and a check-in posting module 784, configured to share the photo and the check-in location in a social network platform.

Figure 8:
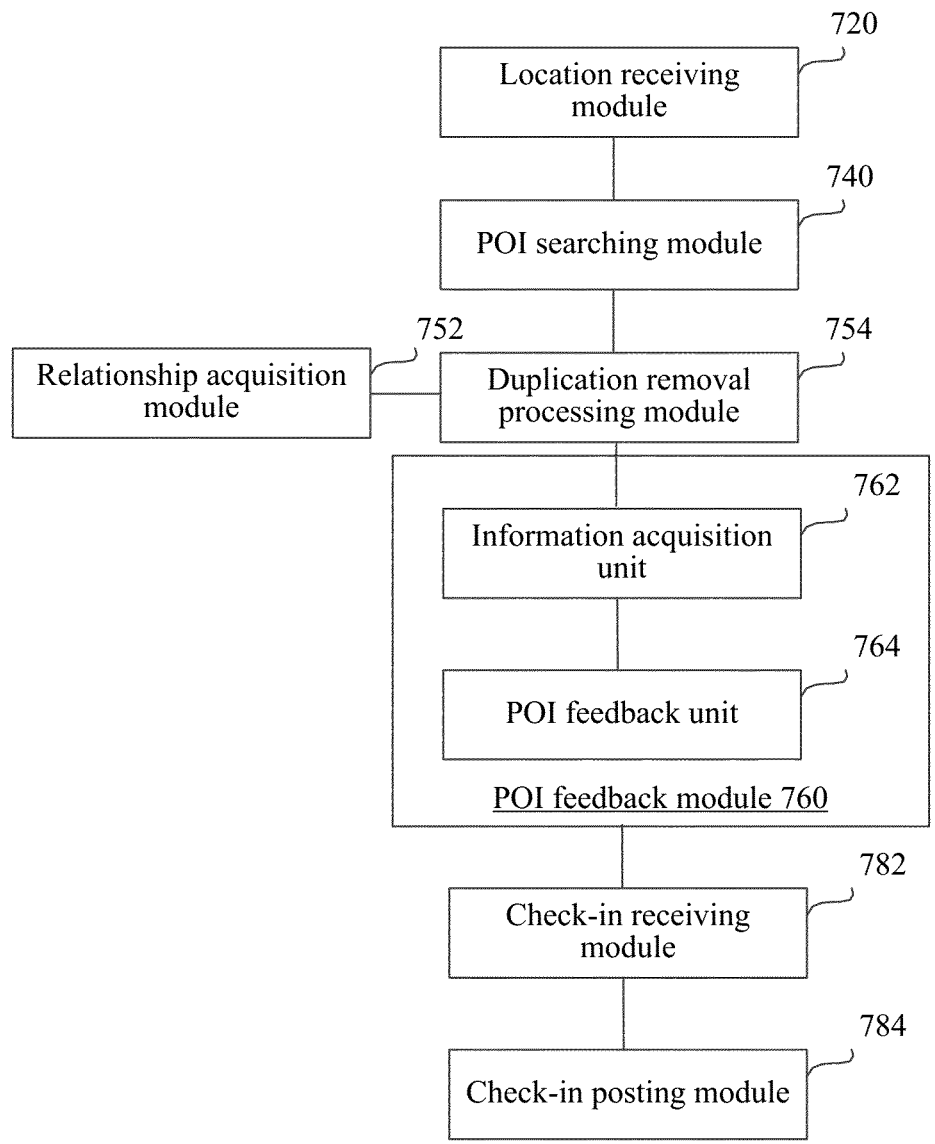
FIG. 8 is a structural block diagram of a photo check-in apparatus in accordance with some embodiments.

FIG. 8 shows a structural block diagram of a photo check-in apparatus in accordance with some embodiments. The photo check-in apparatus may be implemented as all or a part of a server by using software, hardware, or a combination of software and hardware. The photo check-in apparatus includes:

a location receiving module 720, configured to receive locations of photos and a current location that are sent by a mobile device;

a POI searching module 740, configured to search for the plurality of POIs according to locations of the photos and the current location;

a POI feedback module 760, configured to send the plurality of POIs to the mobile device;

a check-in receiving module 782, configured to receive the photo and the check-in location that are sent by the mobile device, where the check-in location is a POI selected by the mobile device from the at least one candidate POI; and a check-in posting module 784, configured to post the photo and the check-in location in a social network platform.

In accordance with some embodiments, the POI searching module 740 is configured to search for the plurality of POIs.

In accordance with some embodiments, the apparatus further includes: a relationship acquisition module 752 and a duplication removal processing module 754.

The relationship acquisition module 752 is configured to acquire a corresponding relationship between a name of a POI and a real location, and determine whether multiple POI names of correspond to a single POI.

The duplication removal processing module 754 is configured to remove duplicate names of POIs in accordance with the acquired relationships.

In accordance with some embodiments, the POI feedback module 760 includes an information acquisition unit 762 and a POI feedback unit 764.

The information acquisition unit 762 is configured to acquire area information where each candidate POI is located.

The POI feedback unit 764 is configured to send the plurality of POIs and the area information corresponding to each candidate POI to the mobile device.

Figure 9:
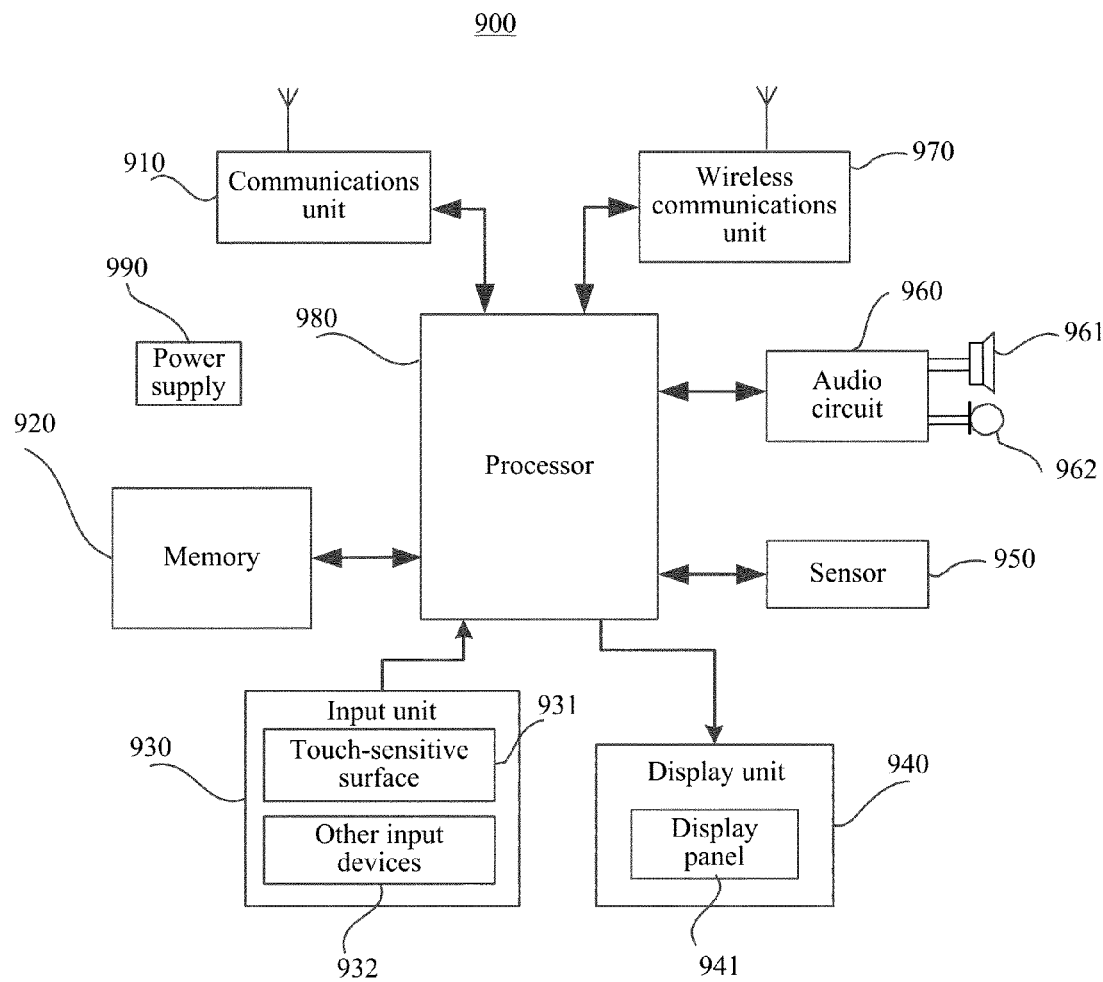
FIG. 9 is a structural block diagram of a mobile device in accordance with some embodiments.

FIG. 9 shows a structural block diagram of a mobile device in accordance with some embodiments. The mobile device 900 may include: a communications unit 910, a memory 920 including one or more computer readable storage media, an input unit 930, a display unit 940, a sensor 950, an audio circuit 960, a Wireless Fidelity (WI-FI) module 970, a processor 980 including one or more processing cores, a power supply 990, and other components. Technical persons in the art may understand that, the structure of the mobile device shown in FIG. 9 does not limit the mobile device, and may include more or less components than those shown in the figure, or combine some components, or have different component layouts.

The communications unit 910 may be configured to receive and send signals in an information receiving and sending process or in a communication process, and the communications unit 910 may be a network communications device, such as a radio frequency (RF) circuit, a router, or a modem. Particularly, when the communications unit 910 is an RF circuit, after receiving downlink information of a base station, the communications unit 910 delivers the downlink information to one or more processors 980 for processing; in addition, the communications unit 910 sends involved uplink data to the base station. Generally, as the communications unit, the RF circuit includes, but not limited to, an antenna, at least one amplifier, a tuner, one or more oscillators, a subscriber identity module (SIM) card, a transceiver, a coupler, a low noise amplifier (LAN), a duplexer, and the like. In addition, the communications unit 910 may further communicate with a network and other devices through wireless communication. The wireless communication may use any communication standard or protocol, including but not limited to a Global System of Mobile Communication (GSM), a General Packet Radio Service (GPRS), Code Division Multiple Access (CDMA), Wideband Code Division Multiple Access (WCDMA), Long Term Evolution (LTE), an Email, a Short Messaging Service (SMS), and the like. The memory 920 may be configured to store software programs and modules, and the processor 980 executes various functional applications and data processing by operating the software programs and the modules that are stored in the memory 920. The memory 920 may mainly include a program storage area and a data storage area, where the program storage area may store an operating system, an application program required for at least one function (such as a sound playback function or an image playback function); and the data storage area may store data (such as audio data, or a phone book) created according to use of the mobile device 900. In addition, the memory 920 may include a high-speed random access memory, and may further include a non-volatile memory, for example, at least one disk memory device, a flash memory device, or other volatile solid memory devices. Correspondingly, the memory 920 may further include a memory controller, so as to provide access of the processor 980 and the input unit 930 to the memory 920.

The input unit 930 may be configured to receive input number or character information, and generate keyboard, mouse, joystick, optical, or trackball signal input related to user settings and function control. Preferably, the input unit 930 may include a touch-sensitive surface 931 and other input devices 932. The touch-sensitive surface 931, also called a touch display screen or a touch panel, may collect touch operations of a user on or near the touch-sensitive surface 931 (for example, operations of a user on or near the touch-sensitive surface 931 with any proper object or accessory such as a finger or a stylus), and drive a corresponding connection apparatus according to a preset program. Optionally, the touch-sensitive surface 931 may include two parts, that is, a touch detection apparatus and a touch controller.

The touch detection apparatus detects a touch position of a user, detects a signal generated by a touch operation, and transmits the signal to the touch controller; and the touch controller receives touch information from the touch detection apparatus, converts the touch information into coordinates of a contact, sends the coordinates to the processor 980, and may receive a command sent by the processor 980 and execute the command. In addition, the touch-sensitive surface 931 may be implemented by using various types, such as resistive, capacitive, infrared, and acoustic wave. In addition to the touch-sensitive surface 931, the input unit 930 may further include other input devices 932. Preferably, other input devices 932 may include, but not limited to, one or more of a physical keyboard, a function key (such as a volume control key and a switch key), a trackball, a mouse, and a joystick.

The display unit 940 may be configured to display information input by a user or information provided to a user and various graphical user interfaces of the mobile device 900, and these graphical user interfaces may be formed by a graphic, text, an icon, a video, and any combination thereof. The display unit 940 may include a display panel 941; optionally, the display panel 941 may be configured in forms such as a liquid crystal display (LCD) and an organic light-emitting diode (OLED). Further, the touch-sensitive surface 931 may cover the display panel 941; when detecting a touch operation on or near the touch-sensitive surface 931, the touch-sensitive surface 931 sends the touch operation to the processor 980 to determine a type of the touch event, and then the processor 980 provides corresponding visual output on the display panel 941 according to the type of the touch event. Though the touch-sensitive surface 931 and the display panel 941 in FIG. 9 are used as two independent components to implement input and output functions, in some embodiments, the touch-sensitive surface 931 and the display panel 941 may be integrated to implement the input and output functions.

The mobile device 900 may further include at least one sensor 950, for example, an optical sensor, a motion sensor, and other sensors. The optical sensor may include an ambient light sensor and a proximity sensor, where the ambient light sensor may adjust the brightness of the display panel 941 according to intensity of ambient light, and the proximity sensor may turn off the display panel 941 and/or backlight when the mobile device 900 moves near an ear. As one kind of motion sensor, a gravity accelerometer may detect the magnitude of acceleration in various directions (generally triaxial), may detect the magnitude and direction of the gravity in the stationary state, and may be applied to applications identifying a posture of a mobile phone (such as switching between landscape and portrait screen orientations, related games, or magnetometer posture calibration), may vibrate to identify related functions (for example, a pedometer, or tapping) and the like. Other sensors such as a gyroscope, a barometer, a hygrometer, a thermometer, and an infrared sensor that may be configured on the mobile device 900 are no longer elaborated herein.

The audio circuit 960, a loudspeaker 961, and a microphone 962 may provide an audio interface between a user and the mobile device 900. The audio circuit 960 may transmit an electrical signal converted from received audio data to the loudspeaker 961, and the loudspeaker 961 converts the electrical signal into a sound signal for output. On the other hand, the microphone 962 converts a collected sound signal into an electrical signal, and the audio circuit 960 receives the electrical signal and then converts the electrical signal into audio data; after the audio data is output to the processor 980 and processed by the processor 980, the audio data is sent to, for example, another mobile device through the RF circuit 960, or the audio data is output to the memory 920 for further processing. The audio circuit 960 may further include an earphone jack, so as to provide communication between a peripheral earphone and the mobile device 900.

To implement wireless communication, the mobile device may be configured with a wireless communications unit 970, and the wireless communications unit 970 may be a Wi-Fi module. Wi-Fi is a short-distance wireless transmission technology, and the mobile device 900 may help a user to send and receive an e-mail, browse a webpage, and access streaming media by using the wireless communications unit 970, which provides wireless broadband Internet access for the user.

The processor 980 is a control center of the mobile device 900, connects various parts of a whole mobile phone by using various interfaces and lines, and executes various functions and processes data of the mobile device 900 by operating or executing software programs and/or modules stored in the memory 920, and by invoking data stored in the memory 920, thereby monitoring the mobile phone as a whole. Optionally, the processor 980 may include one or more processing cores; preferably, the processor 980 may integrate an application processor and a modem processor, where the application processor mainly processes an operating system, a user interface, an application program, and the like, and the modem processor mainly processes wireless communication. It can be understood that the modem processor may also not be integrated into the processor 980.

The mobile device 900 further includes the power supply 990 (such as a battery) supplying power to various components, and preferably, the power supply may be logically connected to the processor 980 by using a power supply management system, so as to implement functions such as charging, discharging, and power consumption management, by using the power supply management system. The power supply 960 may further include any component, such as one or more direct current power supplies or alternating current power supplies, a rechargeable system, a power failure detection circuit, a power supply convertor or inverter, or a power status indicator.

Though not shown, the mobile device 900 may further include a camera, a Bluetooth module, and the like, which are no longer elaborated herein.

In accordance with some embodiments, the mobile device 900 further includes one or more programs, where the one or more programs are stored in the memory, and after configuration, the one or more programs are executed by one or more processors. The one or more programs include instructions used for performing the photo check-in methods provided in the embodiments.

Figure 10:
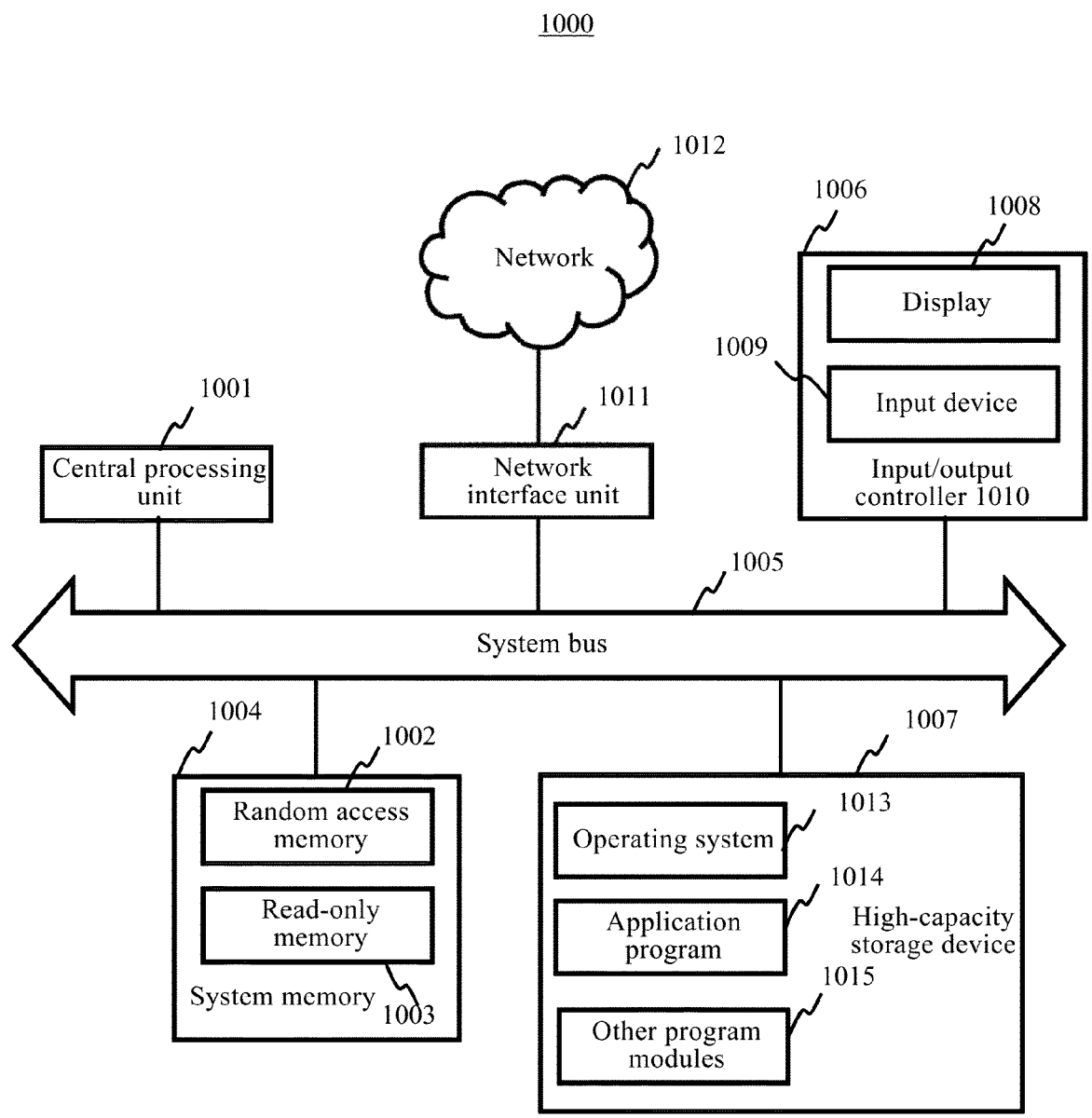
FIG. 10 is a structural block diagram of a server in accordance with some embodiments.

FIG. 10 shows a schematic structural diagram of a server in accordance with some embodiments. The server 1000 includes a central processing unit (CPU) 1001, a system memory 1004 including a random access memory (RAM) 1002 and a read-only memory (ROM) 1003, and a system bus 1005 connecting the system memory 1004 and the CPU 1001. The server 1000 further includes a basic input/output system (an I/O system) 1006 helping various components in the computer transmit information, and a high-capacity storage device 1007 configured to store an operating system 1013, an application program 1014, and other program modules 1015.

The basic I/O system 1006 includes a display 1008 configured to display information and an input device 1009 used by a user to input information, such as a mouse or a keyboard. The display 1008 and the input device 1009 are connected to the CPU 1001 by using an input and output controller 1010 connected to the system bus 1005. The basic I/O system 1006 may further include the input and output controller 1010 configured to receive and process input of multiple other devices, such as a keyboard, a mouse, or an electronic stylus. Similarly, the input and output controller 1010 further provides output to a display, a printer, or output devices of other types.

The high-capacity storage device 1007 is connected to the CPU 1001 by using a high-capacity storage controller (not shown) connected to the system bus 1005. The high-capacity storage device 1007 and an associated computer readable media provide non-volatile storage for the server 1000. In other words, the high-capacity storage device 1007 may include a computer readable medium (not shown), such as a hard disk or a CD-ROM driver.

Without loss of generality, the computer readable media may include a computer storage medium and a communication medium. The computer storage media include volatile and non-volatile, removable and irremovable media implemented by using any method or technology used for storing information such as a computer readable instruction, a data structure, a program module, or other data. The computer storage media include an RAM, an ROM, an EPROM, an EEPROM, a flash memory, or other solid state storage technology, a CD-ROM, a DVD, or other optical memories, a magnetic cassette, a magnetic tape, a magnetic memory, or other magnetic storage devices. Definitely, technical persons in the art may know that the computer storage media are not limited to the foregoing ones. The foregoing system memory 1004 and high-capacity storage device 1007 may be collectively referred to as memories.

In accordance with some embodiments, the server 1000 may be connected to a remote computer on a network for operation through a network such as the Internet. In other words, the server 1000 may be connected to a network 1012 by using a network interface unit 1011 connected to the system bus 1005, or, the server 1000 may also use the network interface unit 1011 to connect to a network of other types or a remote computer system (not shown).

The memory further includes one or more programs, the one or more programs are stored in the memory, and the one or more programs include instructions used for performing the photo check-in method provided in accordance with some embodiments.

Figure 11:
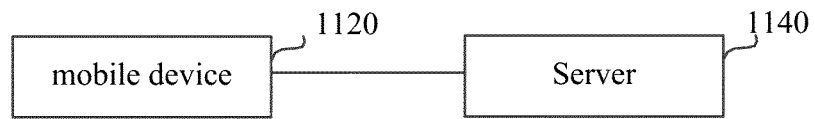
FIG. 11 is a structural block diagram of a photo check-in system in accordance with some embodiments.

FIG. 11 shows a structural block diagram of a photo check-in system in accordance with some embodiments. The system includes a mobile device 1120 and a server 1140, and the mobile device 1120 and the server 1140 are connected through a wired network or wireless network.

Figure 12:
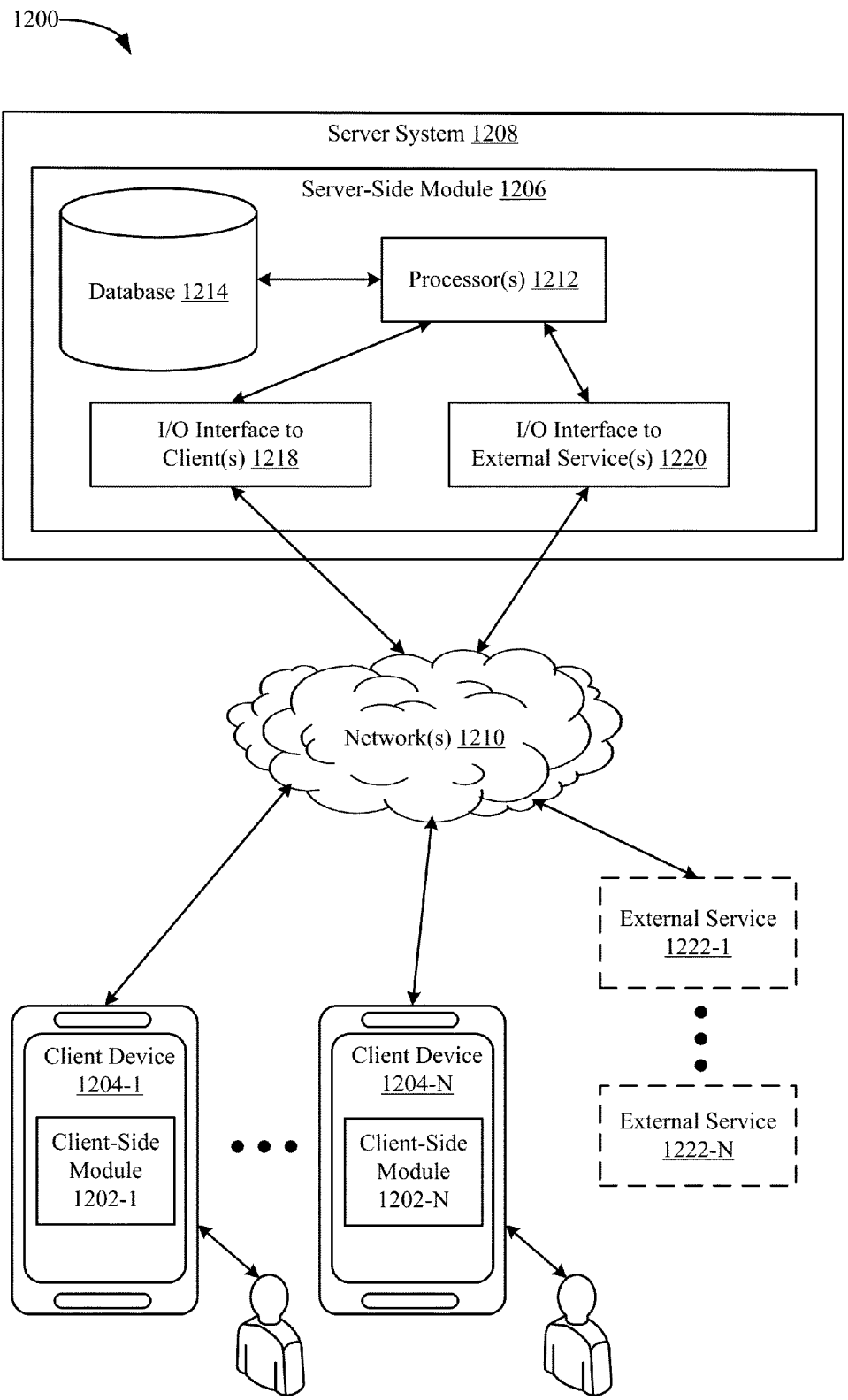
FIG. 12 is a block diagram of a server-client environment in accordance with some embodiments.

As shown in FIG. 12, sharing photos and associated information among users of a social network platform is implemented in a server-client environment 1200 in accordance with some embodiments. In some embodiments, server-client environment 1200 includes client-side processing 1202-1 . . . 902-N (hereinafter "client-side module 1202") executed on a client device 1204-1 . . . 904-N, and server-side processing 1206 (hereinafter "server-side module 1206") executed on a server system 1208. Client-side module 1202 communicates with server-side module 1206 through one or more networks 1210. Client-side module 1202 provides client-side functionalities for the social networking platform (e.g., instant messaging, and social networking services) and communications with server-side module 1206. Server-side module 1206 provides server-side functionalities for the social networking platform (e.g., instant messaging, and social networking services) for any number of client modules 1202 each residing on a respective client device 1204.

In some embodiments, server-side module 1206 includes one or more processors 1212, one or more databases 1214, an I/O interface to one or more clients 1218, and an I/O interface to one or more external services 1220. I/O interface to one or more clients 1218 facilitates the processing of input and output associated with the client devices for server-side module 1206. One or more processors 1212 obtain instant messages from a plurality of users, process the instant messages, process location information of a client device, and share location information of the client device to client-side modules 1202 of one or more client devices. The database 1214 stores various information, including but not limited to, map information, service categories, service provider names, and the corresponding locations. The database 1214 may also store a plurality of user accounts, account settings and account records. I/O interface to one or more external services 1220 facilitates communications with one or more external services 1222 (e.g., business websites of POIs, taxi service, and/or other processing services).

Examples of client device 1204 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 1210 include local area networks (LAN) and wide area networks (WAN) such as the Internet. One or more networks 1210 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 1208 is implemented on one or more standalone data processing apparatuses or a distributed network of computers. In some embodiments, server system 1208 also employs various virtual devices and/or services of third party service providers (e.g., third-party cloud service providers) to provide the underlying computing resources and/or infrastructure resources of server system 1208.

Server-client environment 1200 shown in FIG. 12 includes both a client-side portion (e.g., client-side module 1202) and a server-side portion (e.g., server-side module 1206). In some embodiments, data processing is implemented as a standalone application installed on client device 1204. In addition, the division of functionalities between the client and server portions of client environment data processing can vary in different embodiments. For example, in some embodiments, client-side module 1202 is a thin-client that provides only user-facing input and output processing functions, and delegates all other data processing functionalities to a backend server (e.g., server system 1208).

Figure 13:
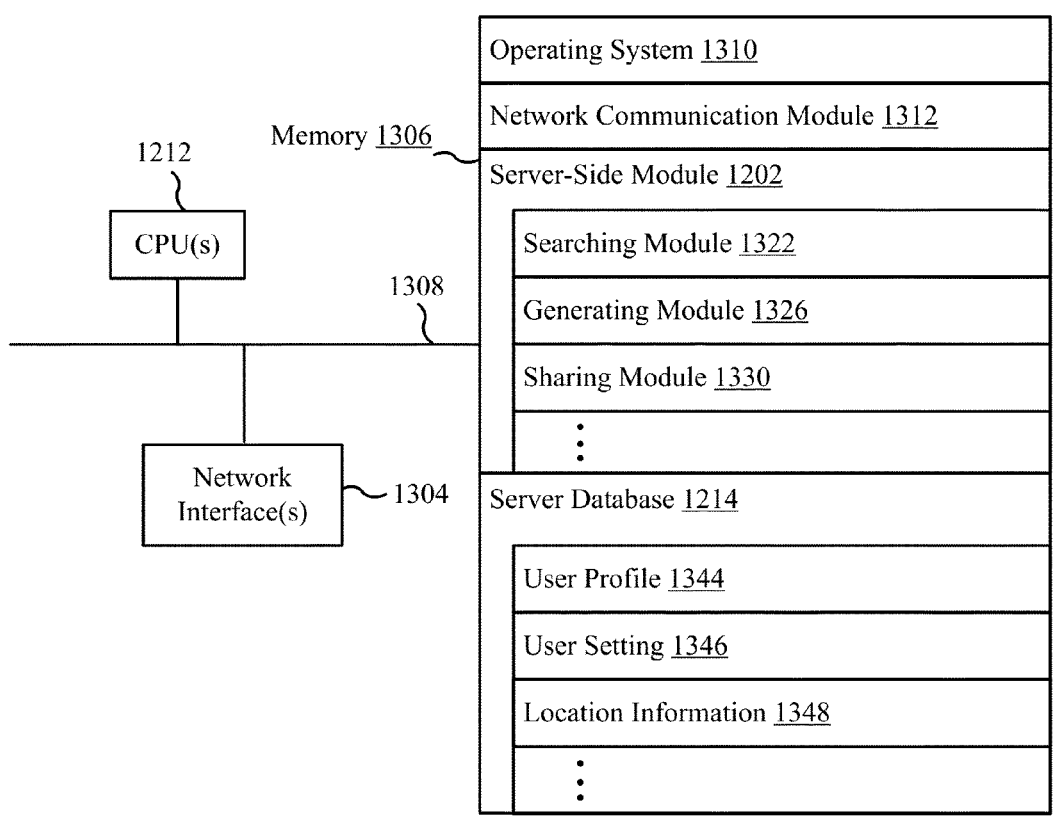
FIG. 13 is a block diagram of a server system in accordance with some embodiments.

FIG. 13 is a block diagram illustrating a server system 1208 in accordance with some embodiments. Server system 1208, typically, includes one or more processing units (CPUs) 1212, one or more network interfaces 1304 (e.g., including I/O interface to one or more clients 1218 and I/O interface to one or more external services 1220), memory 1306, and one or more communication buses 1308 for interconnecting these components (sometimes called a chipset).

Memory 1306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1306, optionally, includes one or more storage devices remotely located from one or more processing units 1212. Memory 1306, or alternatively the non-volatile memory within memory 1306, includes a non-transitory computer readable storage medium. In some implementations, memory 1306, or the non-transitory computer readable storage medium of memory 1306, stores the following programs, modules, and data structures, or a subset or superset thereof:

- operating system 1310 including procedures for handling various basic system services and for performing hardware dependent tasks;
- network communication module 1312 for connecting server system 1208 to other computing devices (e.g., client devices 1204 and external service(s) 1222) connected to one or more networks 1210 via one or more network interfaces 1304 (wired or wireless);
- server-side module 1206, which provides server-side data processing for the social network platform, includes, but is not limited to:
  - searching module 1322 for acquiring pluralities of POIs in accordance with locations received from mobile devices;
  - generating module 1326 for generating maps that include check-in locations and pictures that include information of multiple photos;
  - sharing module 1330 for creating posts including photos, comments, and locations based on predetermined templates; and
- one or more server database 1214 storing data for the social network platform, including but not limited to:
  - user profile 1344 storing user settings, user registration data, user login history, user contact information, user social network accounts, and so on;
  - user setting 1346 storing user preferences of sharing photos, searching locations and preferred format of displaying photos and POIs; and
  - location information 1348 storing locations (e.g., latitudes and longitudes) of POIs and granularity level information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1306, optionally, stores a subset of the modules and data structures identified above. Furthermore, memory 1306, optionally, stores additional modules and data structures not described above.

Figure 14:
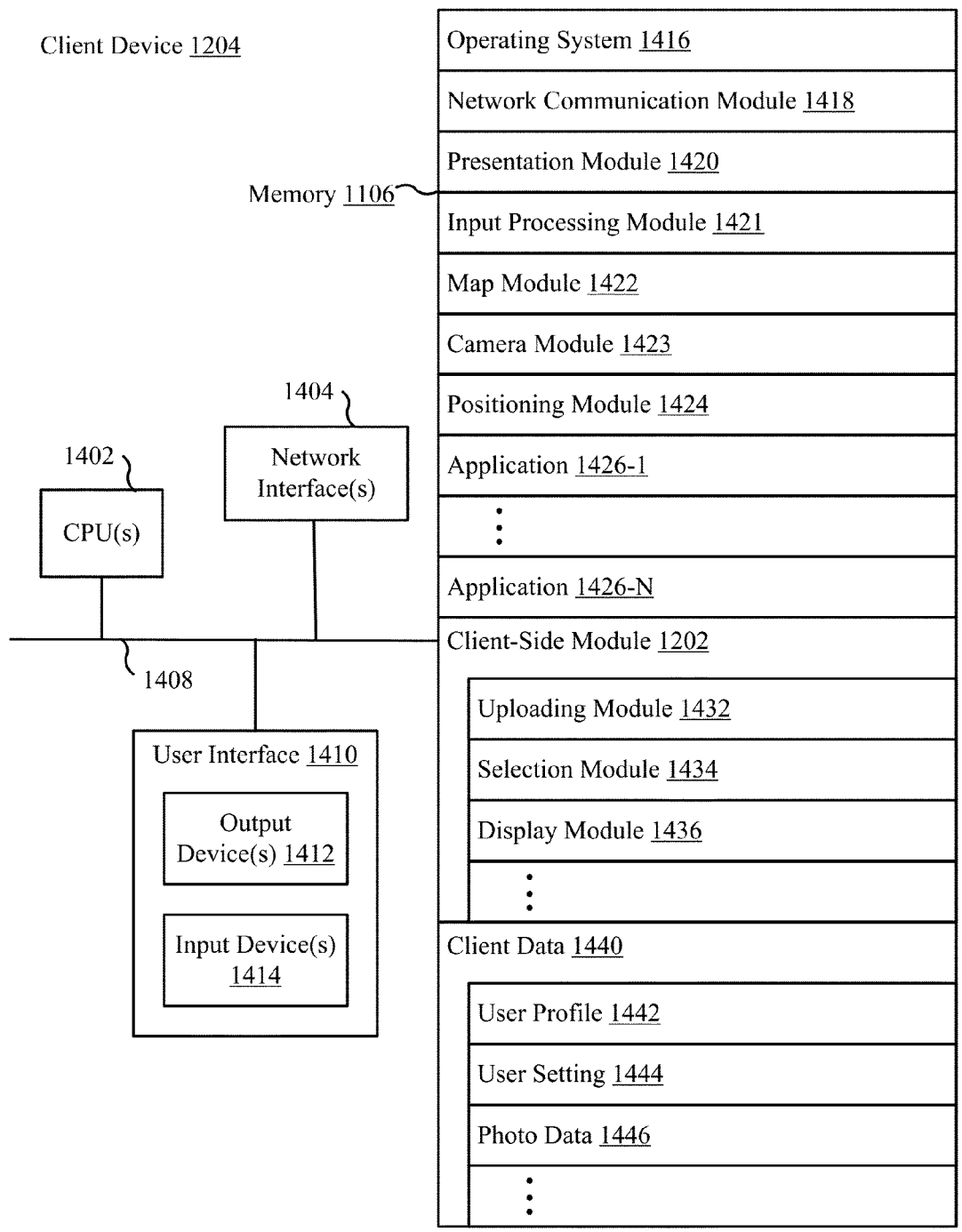
FIG. 14 is a block diagram of a client device in accordance with some embodiments.

FIG. 14 is a block diagram illustrating a representative client device 1204 in accordance with some embodiments. Client device 1204, typically, includes one or more processing units (CPUs) 1402, one or more network interfaces 1404, memory 1406, and one or more communication buses 1408 for interconnecting these components (sometimes called a chipset). Client device 1204 also includes a user interface 1410. User interface device 1410 includes one or more output devices 1412 that enable presentation of media content, including one or more speakers and/or one or more visual displays. User interface device 1410 also includes one or more input devices 1414, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 1204 use a microphone and voice recognition or a camera and gesture recognition to supplement or replace the keyboard.

Memory 1406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1406, optionally, includes one or more storage devices remotely located from one or more processing units 1402. Memory 1406, or alternatively the non-volatile memory within memory 1406, includes a non-transitory computer readable storage medium. In some implementations, memory 1406, or the non-transitory computer readable storage medium of memory 1406, stores the following programs, modules, and data structures, or a subset or superset thereof:

- operating system 1416 including procedures for handling various basic system services and for performing hardware dependent tasks;
- network communication module 1418 for connecting client device 1204 to other computing devices (e.g., server system 1208 and external service(s) 1222) connected to one or more networks 1210 via one or more network interfaces 1404 (wired or wireless);
- presentation module 1420 for enabling presentation of information (e.g., an entry interface, widget, webpage, game, and/or application, audio and/or video content, text, etc.) at client device 1204 via one or more output devices 1412 (e.g., displays, speakers, etc.) associated with user interface 1410;
- input processing module 1421 for detecting one or more user inputs or interactions from one of the one or more input devices 1414 and interpreting the detected input or interaction;
- map module 1422 for displaying maps, check-in locations, points of interest, and other locations;
- a camera module 1423 for taking photos and managing and storing photos;
- a positioning module, such as a GPS application or module, for positioning a current location of the mobile device and locations of photos when the mobile device taking photos;
- one or more applications 1426-1-1426-N for execution by client device 1204 (e.g., games, application marketplaces, social network platforms, social network platforms, and/or other application); and
- client-side module 1202, which provides client-side data processing and functionalities for sharing photos and associated information, including but not limited to:
  - uploading module 1432 for identifying photos and locations and photos and uploading the photos and locations to servers of social network;
  - selection module 1434 for displaying candidate check-in locations and receiving user selections of check-in locations; and
  - display module system 1436 for presenting the photos, check-in locations, maps including check-in locations, and created pictures; and
- client data 1440 storing data of a user associated with the client device, including, but is not limited to:
  - user profile 1442 storing a user profile associated with the user of client device 1204 including a user/account name or handle, login credentials for sharing photos, social network contacts, groups of contacts to which the user belongs, and identified trends and/or likes/dislikes of the user;
  - user setting 1444 storing settings with regard to photo sharing, privacy settings and preferred modes of sharing photos and searching locations, including criteria of determining POIs and locations to be searched; and
  - photo data 1446 storing photos and location, time, person and other information associated with photos.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1406, optionally, stores a subset of the modules and data structures identified above. Furthermore, memory 1406, optionally, stores additional modules and data structures not described above.

In some embodiments, at least some of the functions of server system 1208 are performed by client device 1204, and the corresponding sub-modules of these functions may be located within client device 1204 rather than server system 1208. In some embodiments, at least some of the functions of client device 1204 are performed by server system 1208, and the corresponding sub-modules of these functions may be located within server system 1208 rather than client device 1204. Client device 1204 and server system 1208 shown in FIGS. 13-3, respectively, are merely illustrative, and different configurations of the modules for implementing the functions described herein are possible in various embodiments.

Persons of ordinary skill in the art may understand that, all or part of steps in the embodiments may be implemented through hardware or implemented through a program instructing relevant hardware, the program may be stored in a computer readable storage medium, and the mentioned storage medium may be a read-only memory, a magnetic disk, an optical disc, or the like.

The above descriptions are only preferred embodiments, and are not intended to limit to the present disclosure. Any modification, equivalent replacement and improvement made without departing from the spirit and principle of the present disclosure shall fall within the scope of the present disclosure.

While particular embodiments are described above, it will be understood it is not intended to limit the technology to these particular embodiments. On the contrary, the disclosed implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the technology to the precise forms disclosed. Many modifications and variations are possible in view of the above teachings. The embodiments were chosen and described in order to best explain the principles of the technology and its practical applications, to thereby enable others skilled in the art to best utilize the technology and various embodiments with various modifications as are suited to the particular use contemplated.

What is claimed is:

1. A method of sharing photos and associated information among users of a social network platform, comprising:
   at a mobile device having one or more processors and memory for storing one or more programs to be executed by the one or more processors:
       sending, to a server, a first location of a first photo, a second location of a second photo, and a current location of the mobile device;
       receiving, from the server, a first plurality of points of interest, at least one of which is identified in accordance with its proximity to the first location of the first photo and another one of which is identified in accordance with its proximity to the current location of the mobile device;
       receiving, from the server, a second plurality of points of interest, at least one of which is identified in accordance with its proximity to the second location of the second photo and another one of which is identified in accordance with its proximity to the current location of the mobile device;
       determining a first point of interest among the first plurality of points of interest as a first check-in location of the first photo;
       determining a second point of interest among the second plurality of points of interest as a second check-in location of the second photo; and
       sending the first photo and the first point of interest, and the second photo and the second point of interest, to the server, wherein the server causes the first photo and the first check-in location, and the second photo and the second check-in location to be shared among users of the social network, and wherein the server determines a granularity level at which an encompassing location comprises the first check-in location and the second check-in location, determines the encompassing location, and causes the encompassing location to be shared among the users of the social network in association with the first photo and the second photo.

2. The method of claim 1, further comprising:
   after sending the first point of interest to the server, receiving a post that includes the first check-in location and the first photo; and
   in response to receiving the post, displaying the post in the social network through an application of the social network.

3. The method of claim 1, further comprising:
   after sending the first photo and the first point of interest to the server, from the server, receiving a map that includes the first check-in location;
   displaying the map through an application of the social network;
   receiving a user selection of the first check-in location in the map; and
   in response to the user selection of the first check-in location in the map, displaying the first photo through an application of the social network.

4. The method of claim 1, further comprising:
   from the server, receiving a picture that includes at least part of information from the first photo and at least part of information from the second photo; and
   displaying the received picture in association with the encompassing location.

5. The method of claim 1, further comprising:
   after sending the second photo and the second point of interest to the server, receiving, from the server, a post that includes the first check-in location, the first photo, the first photo, the second check-in location, and the second photo; and
   displaying the post through an application of the social network.

6. A method of sharing photos and associated information among users of a social network platform, comprising:
   at a server having one or more processors and memory for storing one or more programs to be executed by the one or more processors:
       from a mobile device, receiving a first location of a first photo and a current location of the mobile device;
       in response to receiving the first location of the first photo and the current location of the mobile device, acquiring a first plurality of points of interest, at least one of which is acquired in accordance with its proximity to the first location of the first photo and another one of which is acquired in accordance with its proximity to the current location of the mobile device;
       sending the first plurality of points of interest to the mobile device;
       after sending the first plurality of points of interest to the mobile device, receiving the first photo and a first point of interest to the server among the first plurality of points of interest as a first check-in location of the first photo;
       in response to receiving the first check-in location, causing the first photo and the first check-in location to be shared among users of the social network;
       after receiving the first location of the first photo, from the mobile device, receiving a second location of a second photo;
       in response to receiving the second location of the second photo and the current location of the mobile device, acquiring a second plurality of points of interest, at least one of which is acquired in accordance with its proximity to the second location of the second photo and another one of which is acquired in accordance with its proximity to the current location of the mobile device;

sending the second plurality of points of interest to the mobile device;

after sending the second plurality of points of interest to the mobile device, receiving the second photo and a second point of interest among the second plurality of points of interest as a second check-in location of the second photo;

in response to receiving the second check-in location, causing the second photo and the second check-in location to be shared among users of the social network;

determining a granularity level at which an encompassing location comprises the first check-in location and the second check-in location;

determining the encompassing location; and causing the encompassing location to be shared among users of the social network in association with the first photo and the second photo.

7. The method of claim 6, further comprising:

based on a predetermined template, generating a post that includes the first photo and the first check-in location; and causing the post to be shared among users of the social network.

8. The method of claim 7, further comprising:

generating a map that includes the first check-in location;

including the map in the generated post; and causing the map to be shared among users of the social network.

9. The method of claim 6, further comprising:

generating a picture that includes at least part of information from the first photo and at least part of information from the second photo; and causing the generated picture to be shared together with the encompassing location among users of the social network.

10. A device of sharing photos and associated information among users of a social network platform, comprising:

one or more processors; and memory storing one or more programs for execution by the one or more processors, the one or more programs including instructions for:

sending, to a server, a first location of a first photo, a second location of a second photo, and a current location of the device;

receiving, from the server, a first plurality of points of interest, at least one of which is identified in accordance with its proximity to the first location of the first photo and another one of which is identified in accordance with its proximity to the current location of the device;

receiving, from the server, a second plurality of points of interest, at least one of which is identified in accordance with its proximity to the second location of the second photo and another one of which is identified in accordance with its proximity to the current location of the device;

determining a first point of interest among the first plurality of points of interest as a first check-in location of the first photo;

determining a second point of interest among the second plurality of points of interest as a second check-in location of the second photo; and sending the first photo and the first point of interest, and the second photo and the second point of interest, to the server, wherein the server causes the first photo and the first check-in location to be shared among users of the social network, and the second photo and the second check-in location to be shared among users of the social network, and wherein the server determines a granularity level at which an encompassing location comprises the first check-in location and the second check-in location, determines the encompassing location, and causes the encompassing location to be shared among the users of the social network in association with the first photo and the second photo.

11. The device of claim 10, wherein the operations further comprise:

after sending the first point of interest to the server, receiving a post that includes the first check-in location and the first photo; and in response to receiving the post, displaying the post in the social network through an application of the social network.

12. The device of claim 10, wherein the operations further comprise:

after sending the first photo and the first point of interest to the server, from the server, receiving a map that includes the first check-in location;

displaying the map through an application of the social network;

receiving a user selection of the first check-in location in the map; and in response to the user selection of the first check-in location in the map, displaying the first photo through an application of the social network.

13. The device of claim 10, wherein the operations further comprise:

from the server, receiving a picture that includes at least part of information from the first photo and at least part of information from the second photo; and displaying the received picture in association with the encompassing location.

14. The device of claim 10, wherein the operations further comprise:

after sending the second photo and the second point of interest to the server, receiving, from the server, a post that includes the first check-in location, the first photo, the first photo, the second check-in location, and the second photo; and displaying the post through an application of the social network.

* * * * *